US012367803B2

(12) United States Patent
Zhang et al.

(10) Patent No.: US 12,367,803 B2
(45) Date of Patent: Jul. 22, 2025

(54) GAMMA VOLTAGE CONVERSION CIRCUIT, DISPLAY DEVICE AND GAMMA VOLTAGE CONVERSION METHOD

(71) Applicant: BOE Technology Group Co., Ltd., Beijing (CN)

(72) Inventors: Shaoru Zhang, Beijing (CN); Mingchun Lai, Beijing (CN); Xin Duan, Beijing (CN); Wei Sun, Beijing (CN); Shuhuan Yu, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 18/286,617

(22) PCT Filed: Jul. 1, 2022

(86) PCT No.: PCT/CN2022/103345

§ 371 (c)(1),
(2) Date: Oct. 12, 2023

(87) PCT Pub. No.: WO2023/000956

PCT Pub. Date: Jan. 26, 2023

(65) Prior Publication Data

US 2024/0221588 A1 Jul. 4, 2024

(30) Foreign Application Priority Data

Jul. 23, 2021 (CN) ......................... 202110835123.7

(51) Int. Cl.
*G09G 3/20* (2006.01)

(52) U.S. Cl.
CPC ............. *G09G 3/2092* (2013.01); *G09G 3/20* (2013.01); *G09G 2310/027* (2013.01);
(Continued)

(58) Field of Classification Search
CPC ......... G09G 3/2092; G09G 2320/0276; G09G 2320/0673; G09G 2310/0297; G09G 3/20; G09G 2310/027
See application file for complete search history.

(56) References Cited

U.S. PATENT DOCUMENTS

2006/0125761 A1 6/2006 Ahn
2010/0097306 A1* 4/2010 Ker ..................... G09G 3/3696 345/89

(Continued)

FOREIGN PATENT DOCUMENTS

CN 101132178 A 2/2008
CN 101499242 A 8/2009

(Continued)

OTHER PUBLICATIONS

Chinese Office Action dated Nov. 8, 2024 corresponding to application No. 202110835123.7.

(Continued)

*Primary Examiner* — Patrick N Edouard
*Assistant Examiner* — Joseph P Fox
(74) *Attorney, Agent, or Firm* — Nath, Goldberg & Meyer; Joshua B. Goldberg

(57) ABSTRACT

A gamma voltage conversion circuit includes: a first voltage divider circuit having first input terminals and first voltage divider output terminals, wherein each first input terminal is configured to receive a first gamma voltage signal, the first voltage divider circuit is configured to generate first analog voltage signals according to the first gamma voltage signal, and each first voltage divider output terminal is configured to output one of the first analog voltage signals; a Gray code control circuit configured to generate and output a Gray code control signal according to a grayscale value to be displayed; a first encoding circuit configured to generate and output second analog voltage signals according to the Gray code
(Continued)

control signal and one of the plurality of first analog voltage signals; and a first output control circuit configured to generate and output an analog grayscale voltage signal according to the second analog voltage signals.

20 Claims, 11 Drawing Sheets

(52) U.S. Cl.
CPC ............... *G09G 2310/0297* (2013.01); *G09G 2320/0276* (2013.01); *G09G 2320/0673* (2013.01)

(56) References Cited

U.S. PATENT DOCUMENTS

| | | | |
|---|---|---|---|
| 2010/0141494 A1 | 6/2010 | Lee | |
| 2015/0042551 A1 | 2/2015 | Hsu et al. | |
| 2017/0053581 A1* | 2/2017 | Jung | G09G 3/3275 |
| 2018/0358978 A1 | 12/2018 | Wang | |

FOREIGN PATENT DOCUMENTS

| | | |
|---|---|---|
| CN | 101931411 A | 12/2010 |
| CN | 201854269 U | 6/2011 |
| CN | 102118172 A | 7/2011 |
| CN | 104036742 A | 9/2014 |
| CN | 105474304 A | 4/2016 |
| CN | 106157879 A | 11/2016 |
| CN | 109036256 A | 12/2018 |
| CN | 209249057 U | 8/2019 |
| CN | 111434041 A | 7/2020 |
| CN | 111801984 A | 10/2020 |
| CN | 112164360 A | 1/2021 |
| CN | 112233618 A | 1/2021 |

OTHER PUBLICATIONS

Supplementary search report dated Aug. 30, 2024 issued in corresponding European Application No. 22845121.7.

* cited by examiner

GAMMA VOLTAGE CONVERSION CIRCUIT, DISPLAY DEVICE AND GAMMA VOLTAGE CONVERSION METHOD

CROSS REFERENCE TO RELATED APPLICATIONS

This is a National Phase Application filed under 35 U.S.C. 371 as a national stage of PCT/CN2022/103345 filed on Jul. 1, 2022, an application claiming priority to Chinese patent application No. 202110835123.7, filed on Jul. 23, 2021, the entire content of each of which is incorporated herein by reference.

TECHNICAL FIELD

The present disclosure relates to the field of display technologies, and in particular, to a gamma voltage conversion circuit, a display device, and a gamma voltage conversion method.

BACKGROUND

An organic light-emitting diode (OLED) display substrate is a display substrate different from a conventional liquid crystal display (LCD), and has the advantages of active light emission (i.e., self-luminescence), good temperature characteristics, low power consumption, fast response, flexibility, ultra-lightness and thinness, low cost, and the like, and has become one of important development trends of a new generation of display devices. In addition, an active matrix organic light-emitting diode (AMOLED) display substrate has also demonstrated its excellent performance in the field of small-size display. However, in a related display system, a gamma voltage is required to be converted into an analog grayscale voltage for displaying, and in this case, a corresponding gamma voltage conversion circuit is required. At present, a conventional gamma voltage conversion circuit has significant noise and a slow response speed, and grayscale display brightness jitter occurs during gamma voltage conversion, which results in poor brightness uniformity of a display substrate.

SUMMARY

The present disclosure is to solve at least one of the problems existing in the prior art, and provides a gamma voltage conversion circuit, a display device, and a gamma voltage conversion method.

To achieve the above objects, in a first aspect, embodiments of the present disclosure provide a gamma voltage conversion circuit, including:

- a first voltage divider circuit having a plurality of first input terminals and a plurality of first voltage divider output terminals, wherein each of the plurality of first input terminals is configured to receive a first gamma voltage signal input by a first gamma channel, the first voltage divider circuit is configured to generate a plurality of first analog voltage signals according to the first gamma voltage signal, and each of the plurality of first voltage divider output terminals is configured to output one of the plurality of first analog voltage signals;
- a Gray code control circuit configured to generate and output a corresponding Gray code control signal according to a grayscale value to be displayed;

- a first encoding circuit configured to generate and output a plurality of second analog voltage signals according to the Gray code control signal and one of the plurality of first analog voltage signals; and
- a first output control circuit configured to generate and output an analog grayscale voltage signal according to the plurality of second analog voltage signals.

In some embodiments, the first voltage divider circuit includes a plurality of resistors connected in series, a connection node between any two of the plurality of resistors connected in series is a serially connected node, and each serially connected node corresponds to one of the plurality of first voltage divider output terminals.

In some embodiments, the Gray code control signal includes a first Gray code signal and a second Gray code signal, and all bits of the first Gray code signal are opposite to respective bits of the second Gray code signal; and

- the first encoding circuit is further configured to generate and output the plurality of second analog voltage signals according to the first Gray code signal, the second Gray code signal, and one of the plurality of first analog voltage signals.

In some embodiments, the first encoding circuit includes a plurality of switch sub-circuits and a plurality of output sub-circuits;

- each of the plurality of switch sub-circuits includes a plurality of branch circuits, each branch circuit has a second input terminal and a plurality of third input terminals, each second input terminal is configured to receive the first analog voltage signal output by one of the first voltage divider output terminals, each of the third input terminals is configured to receive a first preset bit of the Gray code control signal, each branch circuit is configured to control a turn-on or turn-off state of the branch circuit according to a plurality of first preset bits of the Gray code control signal, and generate a voltage signal to be output according to a received first analog voltage signal while the branch circuit is in the turn-on state; and
- each of the output sub-circuits has a plurality of fourth input terminals and a plurality of fifth input terminals, each of the fourth input terminals is configured to receive the voltage signal to be output from one of the switch sub-circuits, each of the fifth input terminals is configured to receive a second preset bit of the Gray code control signal, each output sub-circuit is configured to control itself to be connected to one of the switch sub-circuits according to a plurality of second preset bits of the Gray code control signal, and generate and output the second analog voltage signals according to the received voltage signal to be output.

In some embodiments, the plurality of first analog voltage signals are in one-to-one correspondence with grayscale values, the plurality of first voltage divider output terminals are in one-to-one correspondence with the grayscale values, the plurality of second analog voltage signals are in one-to-one correspondence with the grayscale values, and a total number of the grayscale values is $2^m$, where m is a positive integer;

- the plurality of switch sub-circuits include a plurality of first switch sub-circuits and a plurality of second switch sub-circuits, each first switch sub-circuit includes 2n branch circuits, and each second switch sub-circuit includes 2n branch circuits, where n is a positive integer; and
- the grayscale values are sorted in ascending order, each adjacent n ones of the first voltage divider output terminals form a group; for N groups of the first voltage divider output terminals of which corresponding grayscale values are smaller than or equal to a preset first threshold, each adjacent two groups of the first voltage divider output terminals are connected to the second input terminals of one of the first switch sub-circuits, where N is a positive integer; for M groups of the first voltage divider output terminals of which corresponding grayscale values are greater than or equal to a preset second threshold, each adjacent two groups of the first voltage divider output terminals are connected to the second input terminals of one of the second switch sub-circuits, and the second threshold is greater than the first threshold, where M is a positive integer.

In some embodiments, the plurality of switch sub-circuits further includes a third switch sub-circuit and a plurality of fourth switch sub-circuits, the third switch sub-circuit includes k branch circuits, and each of the plurality of fourth switch sub-circuits includes n branch circuits, where $k=(2^m-N*n-M*n)/n$, and k is a positive integer; and for multiple groups of the first voltage divider output terminals of which corresponding grayscale values are greater than the first threshold and less than the second threshold, the grayscale values corresponding to each group of the first voltage divider output terminals include a first grayscale value that is the minimum and n−1 second grayscale values, and the first voltage divider output terminals corresponding to each adjacent n first grayscale values are sequentially and alternately connected to both n second input terminals of the third switch sub-circuit and second input terminals of one of the fourth switch sub-circuits.

In some embodiments, m=8, n=4, the grayscale values are sorted in ascending order to include level 0 to level 255, the Gray code control signal includes bit 0 to bit 7 in order from a low bit to a high bit, the first threshold is equal to the grayscale value of 31, and the second threshold is equal to the grayscale value of 224.

In some embodiments, the first preset bits corresponding to each of the first switch sub-circuits and the second switch sub-circuits include bit 0 to bit 4, the first preset bits corresponding to the third switch sub-circuit include bit 2 to bit 7, and the first preset bits corresponding to the fourth switch sub-circuits include bit 3 to bit 7.

In some embodiments, the first encoding circuit has a plurality of switching transistors, the plurality of switching transistors include: first to eighth transistors having control electrodes for receiving opposite bit 0 to opposite bit 7, respectively; and ninth to sixteenth transistors having control electrodes for receiving bit 0 to bit 7, respectively;

each of the first switch sub-circuits and the second switch sub-circuits includes first to eighth branch circuits, the first branch circuit includes a first transistor, a second transistor, a third transistor, a twelfth transistor, and a thirteenth transistor which are connected to each other in sequence, and is configured to receive the first analog voltage signal output by the first voltage divider output terminal corresponding to the grayscale value of 5+8i; the second branch circuit includes a ninth transistor, the second transistor, the third transistor, the twelfth transistor, and the thirteenth transistor which are connected to each other in sequence, and is configured to receive the first analog voltage signal output by the first voltage divider output terminal corresponding to the grayscale value of 4+8i; the third branch circuit includes a first transistor, a tenth transistor, the third transistor, the twelfth transistor, and the thirteenth transistor which are connected to each other in sequence, and is configured to receive the first analog voltage signal output by the first voltage divider output terminal corresponding to the grayscale value of 6+8i; the fourth branch circuit includes a ninth transistor, the tenth transistor, the third transistor, the twelfth transistor, and the thirteenth transistor which are connected to each other in sequence, and is configured to receive the first analog voltage signal output by the first voltage divider output terminal corresponding to the grayscale value of 7+8i; the fifth branch circuit includes a first transistor, a tenth transistor, an eleventh transistor, the twelfth transistor, and the thirteenth transistor which are connected to each other in sequence, and is configured to receive the first analog voltage signal output by the first voltage divider output terminal corresponding to the grayscale value of 1+8i; the sixth branch circuit includes a ninth transistor, the tenth transistor, the eleventh transistor, the twelfth transistor, and the thirteenth transistor which are connected to each other in sequence, and is configured to receive the first analog voltage signal output by the first voltage divider output terminal corresponding to the grayscale value of 0+8i; the seventh branch circuit includes a first transistor, a second transistor, the eleventh transistor, the twelfth transistor, and the thirteenth transistor which are connected to each other in sequence, and is configured to receive the first analog voltage signal output by the first voltage divider output terminal corresponding to the grayscale value of 2+8i; the eighth branch circuit includes a ninth transistor, the second transistor, the eleventh transistor, the twelfth transistor, and the thirteenth transistor which are connected to each other in sequence, and is configured to receive the first analog voltage signal output by the first voltage divider output terminal corresponding to the grayscale value of 3+8i; and i is any one of 0, 1, 2, and 3 for the first switch sub-circuits, and i is any one of 28, 29, 30, and 31 for the second switch sub-circuits.

In some embodiments, the twelfth transistor and the thirteenth transistor are shared by the first to eighth branch circuits, the third transistor is shared by the first to fourth branch circuits, the eleventh transistor is shared by the fifth to eighth branch circuits, one second transistor is shared by the first and second branch circuits, one tenth transistor is shared by the third and fourth branch circuits, another tenth transistor is shared by the fifth and sixth branch circuits, and another second transistor is shared by the seventh and eighth branch circuits.

In some embodiments, each of the fourth switch sub-circuits includes ninth to twelfth branch circuits, the ninth branch circuit includes a fourth transistor, a thirteenth transistor, a sixth transistor, a fifteenth transistor, and a sixteenth transistor which are connected to each other in sequence, and is configured to receive the first analog voltage signal output by the first voltage divider output terminal corresponding to the first grayscale value of 60+32j; the tenth branch circuit includes a twelfth transistor, the thirteenth transistor, the sixth transistor, the fifteenth transistor, and the sixteenth transistor which are connected to each other in sequence, and is configured to receive the first analog voltage signal output by the first voltage divider output terminal corresponding to the first grayscale value of 52+32j; the eleventh branch circuit includes a fourth transistor, a fifth transistor, the sixth transistor, the fifteenth transistor, and the sixteenth transistor which are connected to each other in sequence, and is configured to receive the first analog voltage signal output by the first voltage divider output terminal corresponding to the first grayscale value of 44+32j; the twelfth branch circuit includes a twelfth transistor, the fifth transistor, the sixth transistor, the fifteenth transistor, and the sixteenth transistor which are connected to each other in sequence, and is configured to receive the first analog voltage signal output by the first voltage divider output terminal corresponding to the first grayscale value of 36+32j; where j is any one of 0, 1, 2, 3, 4, and 5; and the third switch sub-circuit includes a plurality of basic units, each of the plurality of basic units includes thirteenth to sixteenth branch circuits, the thirteenth branch circuit includes a third transistor, a thirteenth transistor, a sixth transistor, a fifteenth transistor, and a sixteenth transistor which are connected to each other in sequence, and is configured to receive the first analog voltage signal output by the first voltage divider output terminal corresponding to the first grayscale value of 56+32j; the fourteenth branch circuit includes an eleventh transistor, a twelfth transistor, the thirteenth transistor, the sixth transistor, the fifteenth transistor, and the sixteenth transistor which are connected to each other in sequence, and is configured to receive the first analog voltage signal output by the first voltage divider output terminal corresponding to the first grayscale value of 48+32j; the fifteenth branch circuit includes a third transistor, a fifth transistor, the sixth transistor, the fifteenth transistor, and the sixteenth transistor which are connected to each other in sequence, and is configured to receive the first analog voltage signal output by the first voltage divider output terminal corresponding to the first grayscale value of 40+32j; the sixteenth branch circuit includes an eleventh transistor, a twelfth transistor, the fifth transistor, the sixth transistor, the fifteenth transistor, and the sixteenth transistor which are connected to each other in sequence, and is configured to receive the first analog voltage signal output by the first voltage divider output terminal corresponding to the first grayscale value of 32+32j; for each of the basic units, a fourth transistor is further connected between the eleventh transistor of the fourteenth branch circuit and the fifth transistor of the fifteenth branch circuit; for any adjacent two of the basic units, a fourth transistor is further connected between the eleventh transistor of the sixteenth branch circuit of one basic unit and the thirteenth transistor of the thirteenth branch circuit of the other basic unit.

In some embodiments, the sixth transistor, the fifteenth transistor and the sixteenth transistor are shared by the ninth to twelfth branch circuits, the thirteenth transistor is shared by the ninth and tenth branch circuits, and the fifth transistor is shared by the eleventh and twelfth branch circuits; and for each of the basic units, the sixth transistor, the fifteenth transistor and the sixteenth transistor are shared by the thirteenth to sixteenth branch circuits, the thirteenth transistor is shared by the thirteenth and fourteenth branch circuits, and the fifth transistor is shared by the fifteenth and sixteenth branch circuits.

In some embodiments, the plurality of output sub-circuits include a first output sub-circuit, a second output sub-circuit, and a third output sub-circuit, each of the output sub-circuits has four fourth input terminals, and the four fourth input terminals are configured to respectively receive the voltage signals to be output, which are output by corresponding first switch sub-circuits, corresponding second switch sub-circuits, corresponding third switch sub-circuit, and corresponding fourth switch sub-circuits; and each of the first output sub-circuit and the second output sub-circuit is configured to output one second analog voltage signal according to the voltage signal to be output, and the third output sub-circuit is configured to output two identical second analog voltage signals according to the voltage signal to be output.

In some embodiments, the first output sub-circuit is configured to control itself to be connected to one of the first switch sub-circuits or one of the second switch sub-circuits according to bit 5, bit 6 and bit 7 of the Gray code control signal, or to be connected to the third switch sub-circuit or one of the fourth switch sub-circuits according to bit 2 and bit 3 of the Gray code control signal;

the second output sub-circuit is configured to control itself to be connected to one of the first switch sub-circuits or one of the second switch sub-circuits according to bit 5, bit 6 and bit 7 of the Gray code control signal, or to be connected to the third switch sub-circuit or one of the fourth switch sub-circuits according to bit 0 and bit 1 of the Gray code control signal; and the third output sub-circuit is configured to control itself to be connected to one of the first switch sub-circuits or one of the second switch sub-circuits according to bit 5, bit 6 and bit 7 of the Gray code control signal, or to be connected to the third switch sub-circuit or one of the fourth switch sub-circuits according to bit 1 of the Gray code control signal.

In some embodiments, each of the output sub-circuits has a plurality of switching transistors including: first to eighth transistors having control electrodes for receiving opposite bit 0 to opposite bit 7, respectively; and ninth to sixteenth transistors having control electrodes for receiving bit 0 to bit 7, respectively;

the first output sub-circuit is connected to output terminals of the plurality of fourth switch sub-circuits through a third transistor and a twelfth transistor, and is connected to the output terminals of the plurality of fourth switch sub-circuits through a fourth transistor and an eleventh transistor; the first output sub-circuit is connected to the third switch sub-circuit through an eleventh transistor and a twelfth transistor, and is connected to the third switch sub-circuit through a fourth transistor and a third transistor; the first output sub-circuit is connected to output terminals of the plurality of first switch sub-circuits through a fourteenth transistor, a fifteenth transistor and a sixteenth transistor; and the first output sub-circuit is connected to output terminals of the plurality of second switch sub-circuits through a fourteenth transistor, a fifteenth transistor and an eighth transistor;

the second output sub-circuit is connected to the output terminals of the plurality of fourth switch sub-circuits through a second transistor and a ninth transistor, and is connected to the output terminals of the plurality of fourth switch sub-circuits through a first transistor and a tenth transistor; the second output sub-circuit is connected to the third switch sub-circuit through a ninth transistor and a tenth transistor, and is connected to the third switch sub-circuit through a first transistor and a second transistor; the second output sub-circuit is connected to the output terminals of the plurality of first switch sub-circuits through a fourteenth transistor, a fifteenth transistor and a sixteenth transistor; and the second output sub-circuit is connected to the output terminals of the plurality of second switch sub-circuits through a fourteenth transistor, a fifteenth transistor and an eighth transistor; and the third output sub-circuit is connected to the output terminals of the plurality of fourth switch sub-circuits through a second transistor; the third output sub-circuit is connected to the third switch sub-circuit through a tenth transistor; the third output sub-circuit is connected to the output terminals of the plurality of first switch sub-circuits through a fourteenth transistor, a fifteenth transistor and a sixteenth transistor; and the third output sub-circuit is connected to the output terminals of the plurality of second switch sub-circuits through a fourteenth transistor, a fifteenth transistor and an eighth transistor.

In some embodiments, the first output control circuit includes an operational amplifier, an input terminal of the first output control circuit is configured to receive four second analog voltage signals output by the plurality of output sub-circuits, and the operational amplifier is configured to perform weighted summation according to the four second analog voltage signals to generate the analog grayscale voltage signal.

In some embodiments, the gamma voltage conversion circuit further includes:

a second voltage divider circuit having a plurality of sixth input terminals and a plurality of second voltage divider output terminals, wherein each of the plurality of sixth input terminals is configured to receive a second gamma voltage signal input by a second gamma channel, the second voltage divider circuit is configured to generate a plurality of third analog voltage signals according to the second gamma voltage signal, and each of the plurality of second voltage divider output terminals is configured to output one of the plurality of third analog voltage signals;

a second encoding circuit configured to generate and output a plurality of fourth analog voltage signals according to the Gray code control signal and one of the plurality of third analog voltage signals; and a second output control circuit configured to generate and output an analog grayscale voltage signal according to the plurality of fourth analog voltage signals.

In some embodiments, each of the first encoding circuit and the second encoding circuit includes a plurality of switching transistors, each switching transistor of the first encoding circuit is one of a P-type transistor and an N-type transistor, each switching transistor of the second encoding circuit is the other of the P-type transistor and the N-type transistor, and signals at control electrodes of the switching transistors of the first encoding circuit are opposite to signals at control electrodes of the switching transistors of the second encoding circuit, respectively.

In a second aspect, embodiments of the present disclosure provide a display device, which includes the gamma voltage conversion circuit according to any one of the foregoing embodiments.

In a third aspect, embodiments of the present disclosure provide a gamma voltage conversion method for the gamma voltage conversion circuit according to any one of the foregoing embodiments, the gamma voltage conversion method including:

generating the plurality of first analog voltage signals according to the first gamma voltage signal input by the first gamma channel;

generating a corresponding Gray code control signal according to the grayscale value to be displayed;

generating the plurality of second analog voltage signals according to the Gray code control signal and one of the plurality of first analog voltage signals; and generating and outputting the analog grayscale voltage signal according to the plurality of second analog voltage signals.

In some embodiments, the generating the plurality of second analog voltage signals according to the Gray code control signal and one of the plurality of first analog voltage signals includes:

controlling a turn-on or turn-off state of a branch circuit of a switch sub-circuit according to a plurality of first preset bits of the Gray code control signal, and generating a voltage signal to be output according to the first analog voltage signal received by the branch circuit in the turn-on state; and controlling an output sub-circuit to be connected to the switch sub-circuit according to a plurality of second preset bits of the Gray code control signal, and generating and outputting the second analog voltage signals according to the voltage signal to be output.

In some embodiments, the generating and outputting the analog grayscale voltage signal according to the plurality of second analog voltage signals includes:

performing weighted summation according to the plurality of second analog voltage signals to generate the analog grayscale voltage signal.

In some embodiments, the gamma voltage conversion method further includes:

generating a plurality of third analog voltage signals according to a second gamma voltage signal input by a second gamma channel;

generating a plurality of fourth analog voltage signals according to the Gray code control signal and one of the plurality of third analog voltage signals; and generating and outputting the analog grayscale voltage signal according to the plurality of fourth analog voltage signals.

BRIEF DESCRIPTION OF THE DRAWINGS

The accompanying drawings, which are included to provide a further understanding of the present disclosure and constitute a part of this specification, serve to explain the present disclosure together with the embodiments of the present disclosure, but are not to limit the present disclosure. The above and other features and advantages will become more apparent to one of ordinary skill in the art by describing in detail exemplary embodiments thereof with reference to the accompanying drawings, in which.

DETAILED DESCRIPTION OF EMBODIMENTS

To help one of ordinary skill in the art better understand technical solutions of the present disclosure, a gamma voltage conversion circuit, a display device, and a gamma voltage conversion method provided by the present disclosure will be described in detail below with reference to the accompanying drawings.

Exemplary embodiments will be described more fully hereinafter with reference to the accompanying drawings, and may be embodied in different forms and should not be construed as limited to the embodiments described herein. Rather, these embodiments are provided such that the present disclosure will be thorough and complete, and will fully convey the scope of the present disclosure to one of ordinary skill in the art.

The terms used herein are for the purpose of describing particular embodiments only and are not intended to limit the present disclosure. As used herein, the singular forms “a”, “an” and “the” are intended to include a plural form as well, unless the context clearly indicates otherwise. It will be further understood that the terms “including” and/or “be made of”, when used in this specification, specify the presence of stated features, integers, steps, operations, elements, and/or components, but do not preclude the presence or addition of one or more other features, integers, steps, operations, elements, components, and/or groups thereof.

It will be understood that, although the terms first, second, etc. may be used herein to describe various elements, these elements should not be limited by these terms, and these terms are only configured to distinguishing one element from another. Thus, a first element, component, or module discussed below may be termed a second element, component, or module, without departing from the teachings of the present disclosure.

Unless otherwise defined, all terms (including technical and scientific terms) used herein have the same meaning as commonly understood by one of ordinary skill in the art. It will be further understood that terms, such as those defined in commonly used dictionaries, should be interpreted as having a meaning that is consistent with their meaning in the context of the relevant art and the present disclosure, and should not be interpreted in an idealized or overly formal sense unless expressly so defined herein.

Figure 1:
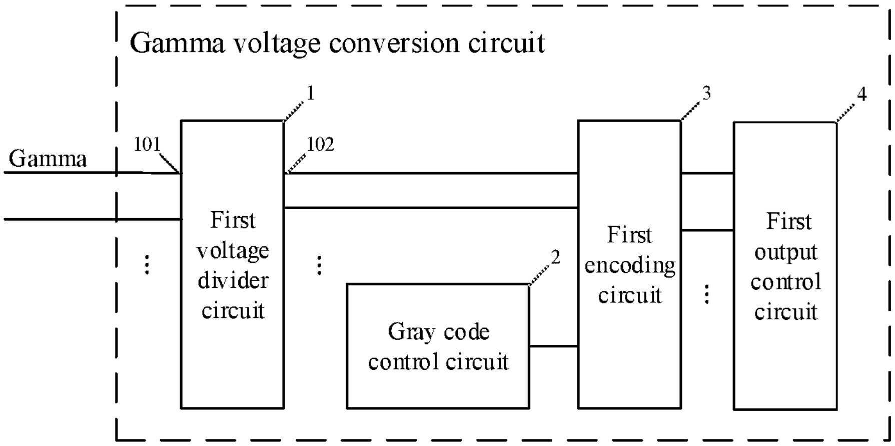
FIG. 1 is a schematic diagram showing a structure of a gamma voltage conversion circuit according to an embodiment of the present disclosure.

FIG. 1 is a schematic diagram showing a structure of a gamma voltage conversion circuit according to an embodiment of the present disclosure. As shown in FIG. 1, the gamma voltage conversion circuit includes: a first voltage divider circuit 1, a Gray code control circuit 2, a first encoding circuit 3, and a first output control circuit 4.

In the present embodiment, the first voltage divider circuit 1 has a plurality of first input terminals 101 and a plurality of first voltage divider output terminals 102. Each of the first input terminals 101 is configured to receive a first Gamma voltage signal input by a first Gamma channel (“Gamma” as shown), and the first voltage divider circuit 1 is configured to generate a plurality of first analog voltage signals according to the first Gamma voltage signal. Each of the first voltage divider output terminals 102 is configured to output one of first analog voltage signals.

The Gray code control circuit 2 is configured to generate and output a corresponding Gray code control signal according to a grayscale value to be displayed.

The first encoding circuit 3 is configured to generate and output a plurality of second analog voltage signals according to the Gray code control signal and one of the plurality of first analog voltage signals.

The first output control circuit 4 is configured to generate and output an analog grayscale voltage signal according to the plurality of second analog voltage signals.

In some embodiments, the first voltage divider circuit 1 includes a plurality of serially connected resistors, a connection node between any two of the plurality of serially connected resistors is a serially connected node. Each serially connected node corresponds to one of the first voltage divider output terminals. In some embodiments, the first voltage divider circuit 1 is also referred to as a resistor string.

In some embodiments, the Gray code control signal includes a first Gray code signal and a second Gray code signal, all bits of the first Gray code signal are opposite to respective bits of the second Gray code signal. The first encoding circuit 3 is further configured to generate and output the plurality of second analog voltage signals according to the first Gray code signal, the second Gray code signal, and one of the plurality of first analog voltage signals.

In some embodiments, an interconversion between a binary code and a Gray code may be performed as follows. A conversion from the binary code to the Gray code includes: reserving the highest bit of the binary code to be the highest bit of the Gray code, taking the XOR (i.e., exclusive OR) result of the highest bit and the second highest bit of the binary code as the second highest bit of the Gray code, then taking the XOR result of the previous bit and the current bit of the binary code as the current bit of the Gray code, and so on, to obtain the Gray code corresponding to the binary code. A conversion from the Gray code to the binary code includes: taking 0 and the highest bit of the Gray code as the highest bit of the binary code, taking the XOR result of the highest bit of the binary code and the second highest bit of the Gray code as the second highest bit of the binary code, then taking the XOR result of the previous bit of the binary code and the current bit of the Gray code as the current bit of the binary code, and so on, to obtain the binary code corresponding to the Gray code.

In the conventional scheme of performing a gamma voltage conversion based on a binary code, the problems of display brightness jitter, brightness non-uniformity, power fluctuation, etc. are caused during performing a grayscale-by-grayscale conversion, and this is because, during performing the grayscale-by-grayscale conversion based on the binary code, there may be a situation that multiple bits are simultaneously flipped, for example, when performing grayscale conversion from grayscale of 127 to grayscale of 128, the corresponding binary codes are from 01111111 to 10000000, i.e., 8 bits are flipped simultaneously, which may generate large glitches and noise. Meanwhile, since lengths of wirings and sizes of loads are different, switches controlled by the 8 bits respectively may not operate at the same time, and an intermediate state may occur during the inversion (or flipping), for example, from 01111111 to 00011111 and then to 10000000, i.e., there is an intermediate state 00011111 that is the grayscale of 31 and is not desirable, which may cause the voltage corresponding to the grayscale of 31 to be momentarily applied (or loaded) during a switching process, resulting in the fluctuation of an output voltage, and the voltage corresponding to the required grayscale (e.g., the grayscale of 128) cannot be output quickly and accurately, affecting the response speed and the time for reaching a steady state. Moreover, since the charging time of each row is short, a far end may be charged insufficiently and thus has a low brightness, causing poor brightness uniformity of a panel and a device. Further, the simultaneous switching of multiple bits also causes large instantaneous load extraction of a digital circuit and an analog circuit, resulting in power supply fluctuation. In a case where Gray codes are adopted, from the grayscale of 127 to the grayscale of 128, the corresponding Gray codes change from 01001000 to 11000000, and only the 7-th bit and the 3-rd bit are flipped; for another example, from the grayscale of 199 to the grayscale of 200, the corresponding Gray codes change from 10100100 to 10101100, and only the 3-rd bit is flipped; and only one bit is flipped in most situations in the application of a Gray code. Therefore, the unstable states in a conversion process is greatly reduced by adopting a Gray code in the conversion, and the output voltage fluctuation caused by multi bits being simultaneously flipped in the grayscale-by-grayscale conversion process is avoided, which enables an output to reach a target voltage more quickly and accurately, and enables the response speed to be improved.

In embodiments of the present disclosure, the gamma voltage conversion is performed by adopting an encoding circuit based on a Gray code and the like, and at most two bits of two adjacent grayscales corresponding to the Gray code are changed in a conversion process, such that the multi-bit change (or flipping) as well as the unstable state and the intermediate state during the multi-bit change (or flipping) are avoided, the response speed is improved, glitches and noise of the circuit are reduced, and the grayscale display brightness is changed more smoothly during the grayscale-by-grayscale switching, thereby solving the problems of display jitter and power supply fluctuation caused by the grayscale-by-grayscale switching. Further, since the output reaches the target potential more accurately, a voltage at a far end and a voltage at a near end in a panel are consistent with each other, the brightness is uniform, and thus the panel has a better brightness uniformity.

Figure 2:
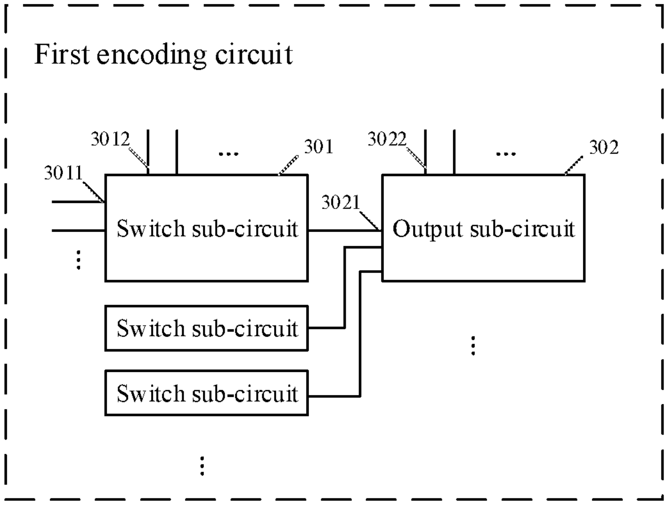
FIG. 2 is a schematic diagram showing a structure of a first encoding circuit according to an embodiment of the present disclosure.

FIG. 2 is a schematic diagram showing a structure of a first encoding circuit according to an embodiment of the present disclosure. Specifically, this structure is an alternative detailed embodiment based on the gamma voltage conversion circuit shown in FIG. 1. As shown in FIG. 2, the first encoding circuit includes a plurality of switch sub-circuits 301 and a plurality of output sub-circuits 302.

Each switch sub-circuit 301 includes a plurality of branch circuits, and each branch circuit has a second input terminal 3011 and a plurality of third input terminals 3012. Each second input terminal 3011 is configured to receive the first analog voltage signal output by one of the first voltage divider output terminals, and each third input terminal 3012 is configured to receive a first preset bit of the Gray code control signal. Each branch circuit is configured to control a turn-on or turn-off state of the branch circuit according to a plurality of first preset bits of the Gray code control signal, and generate a voltage signal to be output according to the received first analog voltage signal when the branch circuit is in the turn-on state.

Each output sub-circuit 302 has a plurality of fourth input terminals 3021 and a plurality of fifth input terminals 3022. Each fourth input terminal 3021 is configured to receive the voltage signal to be output from one of the switch sub-circuits 301, and each fifth input terminal 3022 is configured to receive a second preset bit of the Gray code control signal. Each output sub-circuit 302 is configured to control itself to be connected to the one of the switch sub-circuits 301 according to a plurality of second preset bits of the Gray code control signal, and generate and output the second analog voltage signal according to the received voltage signal to be output. It should be noted that, in the embodiments of the present disclosure, a circuit connected between one of the second input terminals and the output terminal of each switch sub-circuit is referred to as the branch circuit in the switch sub-circuit.

Figure 3:
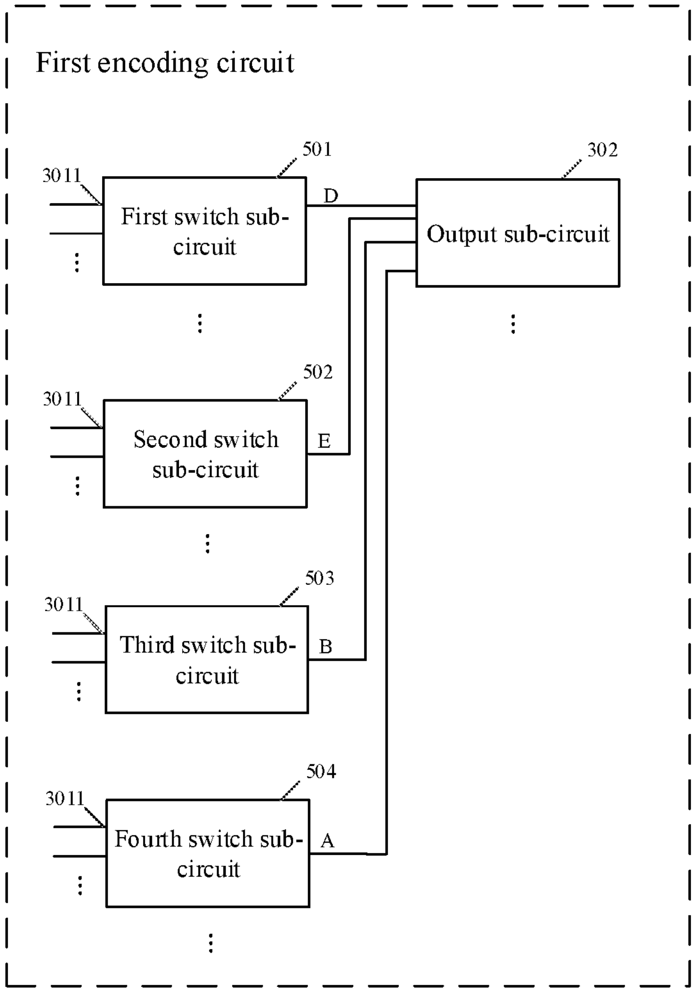
FIG. 3 is a schematic diagram showing a structure of another first encoding circuit according to an embodiment of the present disclosure.

FIG. 3 is a schematic diagram of another first encoding circuit according to an embodiment of the present disclosure. In particular, the first encoding circuit shown in FIG. 3 is an alternative detailed embodiment based on the first encoding circuit shown in FIG. 2, in which the first analog voltage signals are in one-to-one correspondence with grayscale values, the first voltage divider output terminals are in one-to-one correspondence with grayscale values, the second analog voltage signals are in one-to-one correspondence with the grayscale values, and the total number of the grayscale values is $2^m$, where m is a positive integer.

As shown in FIG. 3, the plurality of switch sub-circuits includes a plurality of first switch sub-circuits 501 and a plurality of second switch sub-circuits 502. Each first switch sub-circuit 501 includes 2n branch circuits, and each second switch sub-circuit 502 includes 2n branch circuits, where n is a positive integer. With sorting the corresponding grayscale values in ascending order, each n adjacent ones of the first voltage divider output terminals form a group. For N groups of first voltage divider output terminals of which the corresponding grayscale values are less than or equal to a preset first threshold, each two adjacent groups of first voltage divider output terminals are connected to the second input terminals 3011 in one of the first switch sub-circuits 501, where N is a positive integer. For M groups of first voltage divider output terminals of which the corresponding grayscale values are greater than or equal to a preset second threshold, each two adjacent groups of first voltage divider output terminals are connected to the second input terminals 3011 of one of the second switch sub-circuits 502, and the second threshold is greater than the first threshold, where M is a positive integer. As shown, the first switch sub-circuit 501 corresponds to an output terminal D, and the second switch sub-circuit 502 corresponds to an output terminal E.

In some embodiments, m=8, n=4, the corresponding grayscale values are sorted in ascending order to include level 0 to level 255, and the Gray code control signal includes bit 0 to bit 7 in an order from a low bit to a high bit. The first threshold is equal to the grayscale value of 31, and the second threshold is equal to the grayscale value of 224.

For example, the output of the first voltage divider circuit is nonlinear, particularly, the nonlinearity is large when the output corresponds to a low grayscale (ranging from, for example, level 0 to level 31 in the present embodiment) and a high grayscale (ranging from, for example, level 224 to level 255 in the present embodiment), and thus the output needs to be made grayscale-by-grayscale for a low grayscale portion and a high grayscale portion.

In some embodiments, the first encoding circuit has a plurality of switching transistors, which include: first to eighth transistors 601 to 608 having control electrodes (i.e., gate electrodes) for receiving opposite bit 0 to opposite bit 7, respectively, the reference symbol "Sn<0>" as shown represents the opposite bit 0, and the other similar reference symbols represents similar objects; ninth to sixteenth transistors 609 to 616 having control electrodes for receiving bit 0 to bit 7, respectively, the reference symbol "S<0>" as shown represents bit 0, and the other similar reference symbols represents similar objects.

Figure 3A:
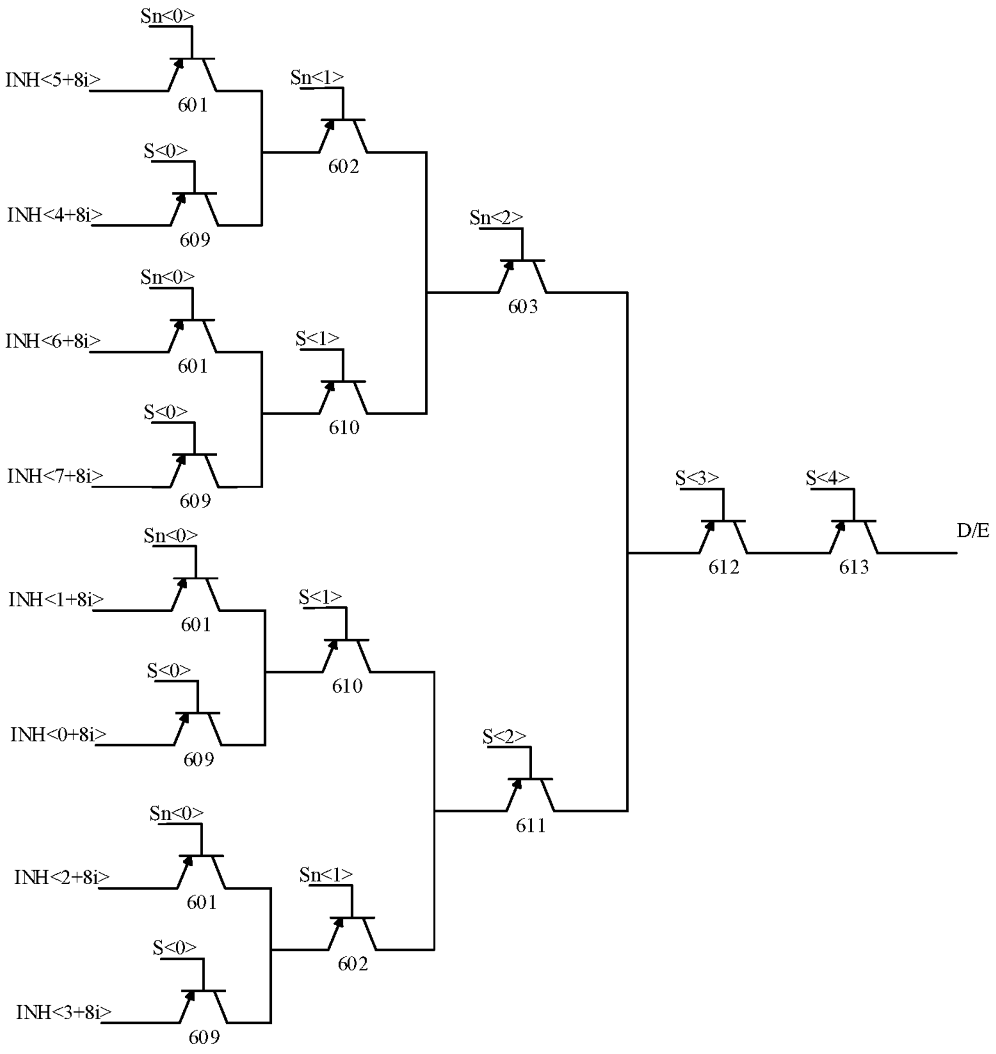
FIG. 3*a* is a schematic diagram showing a structure of a first switch sub-circuit or a second switch sub-circuit according to an embodiment of the present disclosure.

FIG. 3*a* is a schematic diagram showing a structure of a first switch sub-circuit or a second switch sub-circuit according to an embodiment of the present disclosure. As shown in FIG. 3*a*, which corresponds to the case of m=8 and n=4, a structure of the first switch sub-circuit 501 or a structure of the second switch sub-circuit 502 is exemplarily shown. It should be noted that these values of m and n do not limit the technical solutions in this embodiment and the subsequent embodiments, and other values of m and n may also be applicable to the technical solutions of the present disclosure.

The first preset bits corresponding to each of the first switch sub-circuit 501 and the second switch sub-circuit 502 include bit 0 to bit 4.

For example, the number of the first switch sub-circuits 501 is 4, and the number of the second switch sub-circuits 502 is 4. Each of the first switch sub-circuits 501 includes first to eighth branch circuits, and each of the second switch sub-circuits 502 includes first to eighth branch circuits. The first branch circuit includes a first transistor 601, a second transistor 602, a third transistor 603, a twelfth transistor 612, and a thirteenth transistor 613 connected to each other in sequence, and is configured to receive the first analog voltage signal output by the first voltage divider output terminal corresponding to the grayscale value of 5+8i (i.e., level 5+8i). In the figures, the reference symbol "INH<5+8i>" represents an object configured to be received by a corresponding branch circuit, and other similar reference symbols represent similar objects. The second branch circuit includes a ninth transistor 609, the second transistor 602, the third transistor 603, the twelfth transistor 612, and the thirteenth transistor 613 connected to each other in sequence, and is configured to receive the first analog voltage signal output by the first voltage divider output terminal corresponding to the grayscale value of 4+8i (i.e., level 4+8i). The third branch circuit includes a first transistor 601, a tenth transistor 610, the third transistor 603, the twelfth transistor 612, and the thirteenth transistor 613 connected to each other in sequence, and is configured to receive the first analog voltage signal output by the first voltage divider output terminal corresponding to the grayscale value of 6+8i (i.e., level 6+8i). The fourth branch circuit includes a ninth transistor 609, the tenth transistor 610, the third transistor 603, the twelfth transistor 612, and the thirteenth transistor 613 connected to each other in sequence, and is configured to receive the first analog voltage signal output by the first voltage divider output terminal corresponding to the grayscale value of 7+8i (i.e., level 7+8i). The fifth branch circuit includes a first transistor 601, a tenth transistor 610, an eleventh transistor 611, the twelfth transistor 612, and the thirteenth transistor 613 connected to each other in sequence, and is configured to receive the first analog voltage signal output by the first voltage divider output terminal corresponding to the grayscale value of 1+8i (i.e., level 1+8i). The sixth branch circuit includes a ninth transistor 609, the tenth transistor 610, the eleventh transistor 611, the twelfth transistor 612, and the thirteenth transistor 613 connected to each other in sequence, and is configured to receive the first analog voltage signal output by the first voltage divider output terminal corresponding to the grayscale value of 0+8i (i.e., level 0+8i). The seventh branch circuit includes a first transistor 601, a second transistor 602, the eleventh transistor 611, the twelfth transistor 612, and the thirteenth transistor 613 connected to each other in sequence, and is configured to receive the first analog voltage signal output by the first voltage divider output terminal corresponding to the grayscale value of 2+8i (i.e., level 2+8i). The eighth branch circuit includes a ninth transistor 609, the second transistor 602, the eleventh transistor 611, the twelfth transistor 612, and the thirteenth transistor 613 connected to each other in sequence, and is configured to receive the first analog voltage signal output by the first voltage divider output terminal corresponding to the grayscale value of 3+8i (i.e., level 3+8i).

For the first switch sub-circuit 501, i is any one of 0, 1, 2, and 3, and for the second switch sub-circuit 502, i is any one of 28, 29, 30, and 31. As shown in FIG. 3*a*, the first switch sub-circuit 501 corresponds to the output terminal D, and the second switch sub-circuit 502 corresponds to the output terminal E.

In some embodiments, as shown in FIG. 3*a*, the twelfth transistor 612 and the thirteenth transistor 613 are multiplexed (i.e., shared) by the first to eighth branch circuits. The third transistor 603 is shared by the first to fourth branch circuits, and the eleventh transistor 611 is shared by the fifth to eighth branch circuits. The second transistor 602 is shared by the first and second branch circuits, and the tenth transistor 610 is shared by the third and fourth branch circuits. Another tenth transistor 610 is shared by the fifth and sixth branch circuits, and another second transistor 602 is shared by the seventh and eighth branch circuits.

In some embodiments, as shown in FIG. 3, the plurality of switch sub-circuits further includes a third switch sub-circuit 503 and a plurality of fourth switch sub-circuits 504. The third switch sub-circuit 503 includes k branch circuits, and each fourth switch sub-circuit 504 includes n branch circuits, where k=(2m−N*n−M*n)/n, and k is a positive integer.

For multiple groups of first voltage divider output terminals of which the corresponding grayscale values are greater than the first threshold and less than the second threshold, the grayscale values corresponding to each group of first voltage divider output terminals include a first grayscale value that is the smallest and n−1 second grayscale values, and the first voltage divider output terminals corresponding to each four adjacent first grayscale values are sequentially and alternately connected to the n second input terminals 3011 of the third switch sub-circuit 503 and the second input terminals 3011 of one of the fourth switch sub-circuits 504. As shown, the third switch sub-circuit 503 corresponds to the output terminal B, and the fourth switch sub-circuit 504 corresponds to the output terminal A.

Specifically, the output of the first voltage divider circuit is nonlinear, particularly, the nonlinearity is large when the output corresponds to the low grayscale and the high grayscale, and thus the output needs to be made grayscale-by-grayscale based on the first switch sub-circuit 501 and the second switch sub-circuit 502 for a low grayscale portion and a high grayscale portion. Whereas for a grayscale located in a middle portion, the output may be made by using the third switch sub-circuit and the fourth switch sub-circuit described below based on the principle of reducing an occupied area.

Figure 3B:
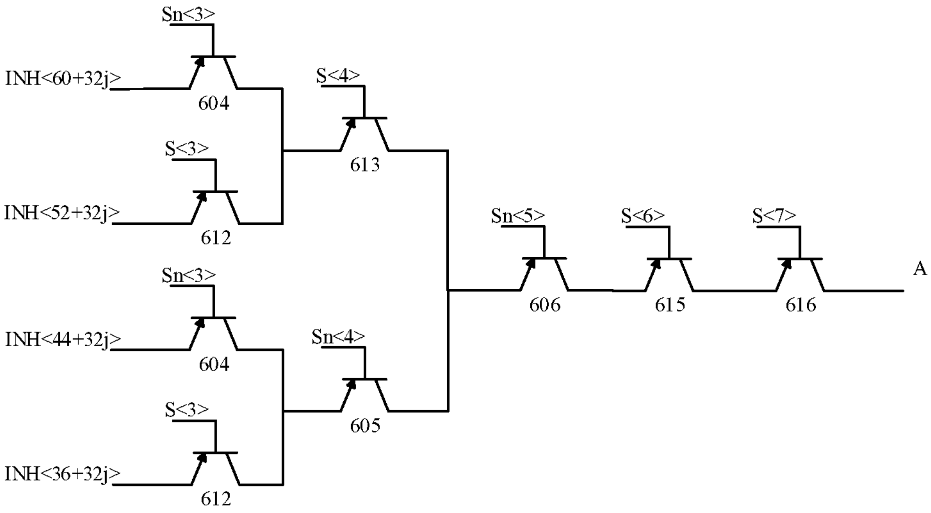
FIG. 3*b* is a schematic diagram showing a structure of a fourth switch sub-circuit according to an embodiment of the present disclosure.

FIG. 3*b* is a schematic diagram showing a structure of a fourth switch sub-circuit according to an embodiment of the present disclosure. As shown in FIG. 3*b*, which corresponds to the case of m=8 and n=4, a structure of the fourth switch sub-circuit 504 is exemplarily shown. The first preset bits corresponding to the fourth switch sub-circuit 504 include bit 3 to bit 7.

For example, the total number of the fourth switch sub-circuits 504 is 6, and each fourth switch sub-circuit 504 includes ninth to twelfth branch circuits. The ninth branch circuit includes a fourth transistor 604, a thirteenth transistor 613, a sixth transistor 606, a fifteenth transistor 615, and a sixteenth transistor 616 which are connected to each other in sequence, and is configured to receive the first analog voltage signal output by the first voltage divider output terminal 102 corresponding to the first grayscale value of 60+32j. The tenth branch circuit includes a twelfth transistor 612, the thirteenth transistor 613, the sixth transistor 606, the fifteenth transistor 615, and the sixteenth transistor 616 which are connected to each other in sequence, and is configured to receive the first analog voltage signal output by the first voltage divider output terminal 102 corresponding to the first grayscale value of 52+32j. The eleventh branch circuit includes a fourth transistor 604, a fifth transistor 605, the sixth transistor 606, the fifteenth transistor 615, and the sixteenth transistor 616 which are connected to each other in sequence, and is configured to receive the first analog voltage signal output by the first voltage divider output terminal 102 corresponding to the first grayscale value of the 44+32j. The twelfth branch circuit includes a twelfth transistor 612, the fifth transistor 605, the sixth transistor 606, the fifteenth transistor 615, and the sixteenth transistor 616 which are connected to each other in sequence, and is configured to receive the first analog voltage signal output by the first voltage divider output terminal 102 corresponding to the first grayscale value of 36+32j, where j is any one of the values of 0, 1, 2, 3, 4 and 5.

In some embodiments, as shown in FIG. 3*b*, the sixth transistor 606, the fifteenth transistor 615 and the sixteenth transistor 616 are shared by the ninth through twelfth branch circuits. The thirteenth transistor 613 is shared by the ninth and tenth branch circuits, and the fifth transistor 605 is shared by the eleventh and twelfth branch circuits.

Figure 3C:
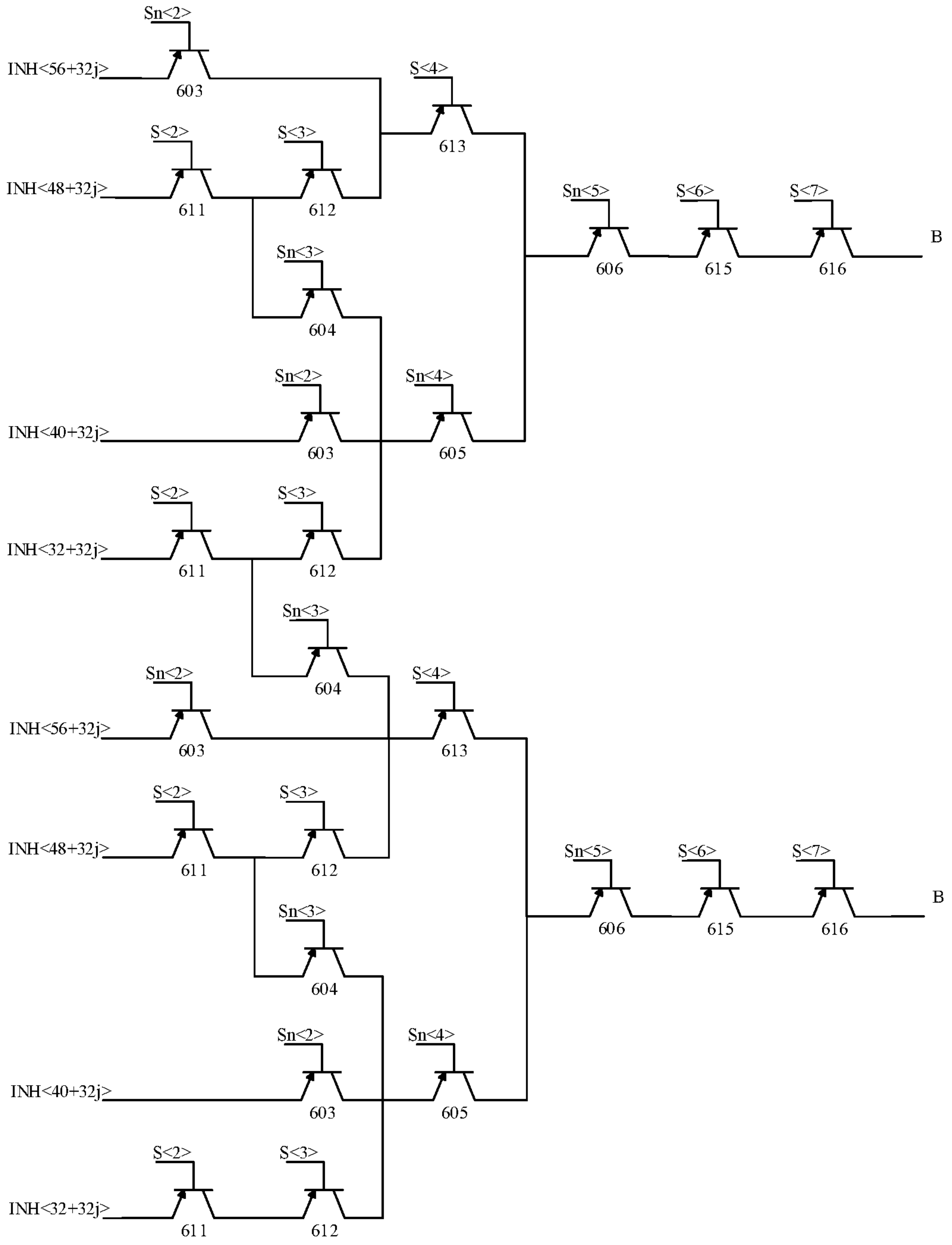
FIG. 3*c* is a schematic diagram showing a structure of a plurality of basic units of a third switch sub-circuit according to an embodiment of the present disclosure.

FIG. 3*c* is a schematic diagram showing a structure of a plurality of basic units of a third switch sub-circuit according to an embodiment of the present disclosure. As shown in FIG. 3*c*, which corresponds to the case of m=8 and n=4, a structure of the third switch sub-circuit 503 is exemplarily shown. The first preset bits corresponding to the third switch sub-circuit 503 include bit 2 to bit 7.

Specifically, the third switch sub-circuit 503 includes 6 basic units, two of which are exemplarily shown in the figure. Each of the basic units includes thirteenth to sixteenth branch circuits. The thirteenth branch circuit includes a third transistor 603, a thirteenth transistor 613, a sixth transistor 606, a fifteenth transistor 615, and a sixteenth transistor 616 which are connected to each other in sequence, and is configured to receive the first analog voltage signal output by the first voltage divider output terminal 102 corresponding to the first grayscale value of 56+32j. The fourteenth branch circuit includes an eleventh transistor 611, a twelfth transistor 612, the thirteenth transistor 613, the sixth transistor 606, the fifteenth transistor 615, and the sixteenth transistor 616 which are connected to each other in sequence, and is configured to receive the first analog voltage signal output by the first voltage divider output terminal 102 corresponding to the first grayscale value of 48+32j. The fifteenth branch circuit includes a third transistor 603, a fifth transistor 605, the sixth transistor 606, the fifteenth transistor 615, and the sixteenth transistor 616 which are connected to each other in sequence, and is configured to receive the first analog voltage signal output by the first voltage divider output terminal 102 corresponding to the first grayscale value of 40+32j. The sixteenth branch circuit includes an eleventh transistor 611, a twelfth transistor 612, the fifth transistor 605, the sixth transistor 606, the fifteenth transistor 615, and the sixteenth transistor 616 which are connected to each other in sequence, and is configured to receive the first analog voltage signal output by the first voltage divider output terminal 102 corresponding to the first grayscale value of 32+32j. For each basic unit, a fourth transistor 604 is further connected between the eleventh transistor 611 of the fourteenth branch circuit and the fifth transistor 605 of the fifteenth branch circuit. For two adjacent basic units, a fourth transistor 604 is connected between the eleventh transistor 611 of the sixteenth branch circuit of one basic unit and the thirteenth transistor 613 of the thirteenth branch circuit of the other basic unit.

In some embodiments, as shown in FIG. 3*c*, for each basic unit, the sixth transistor 606, the fifteenth transistor 615 and the sixteenth transistor 616 are shared by the thirteenth to sixteenth branch circuits, the thirteenth transistor 613 is shared by the thirteenth and fourteenth branch circuits, and the fifth transistor 605 is shared by the fifteenth and sixteenth branch circuits.

Figure 4:
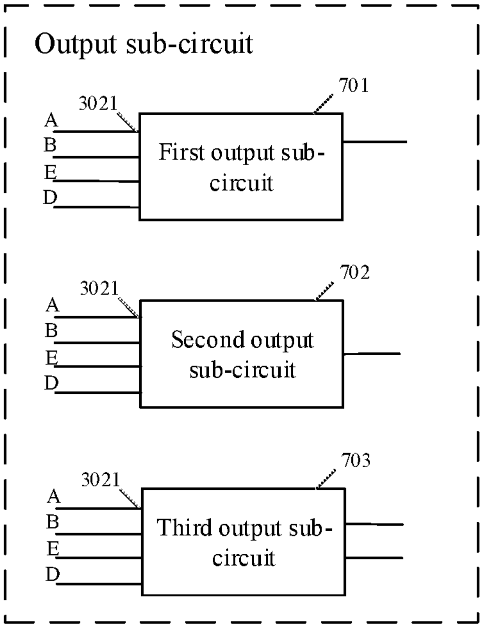
FIG. 4 is a schematic diagram of an output sub-circuit according to an embodiment of the present disclosure.

FIG. 4 is a schematic diagram of an output sub-circuit according to an embodiment of the present disclosure. In particular, the structure shown in FIG. 4 is an alternative detailed embodiment based on the first encoding circuit shown in FIG. 3. For example, the plurality of output sub-circuits include a first output sub-circuit 701, a second output sub-circuit 702, and a third output sub-circuit 703. Each output sub-circuit 302 has four fourth input terminals 3021, which are configured to receive voltage signals to be output from the corresponding plurality of first switch sub-circuits, the corresponding plurality of second switch sub-circuits, the corresponding third switch sub-circuits, and the corresponding plurality of fourth switch sub-circuits, i.e., are configured to be connected to the output terminals A, B, D, and E of the respective switch sub-circuits.

Each of the first output sub-circuit 701 and the second output sub-circuit 702 is configured to output a second analog voltage signal according to a voltage signal to be output, and the third output sub-circuit 703 is configured to output two identical second analog voltage signals according to the voltage signal to be output.

In some embodiments, each output sub-circuit has a plurality of switching transistors. The plurality of switching transistors include first to eighth transistors 601 to 608, which have control electrodes for receiving opposite bit 0 to opposite bit 7, respectively, and ninth to sixteenth transistors 609 to 616, which have control electrodes for receiving bit 0 to bit 7, respectively.

Figure 4A:
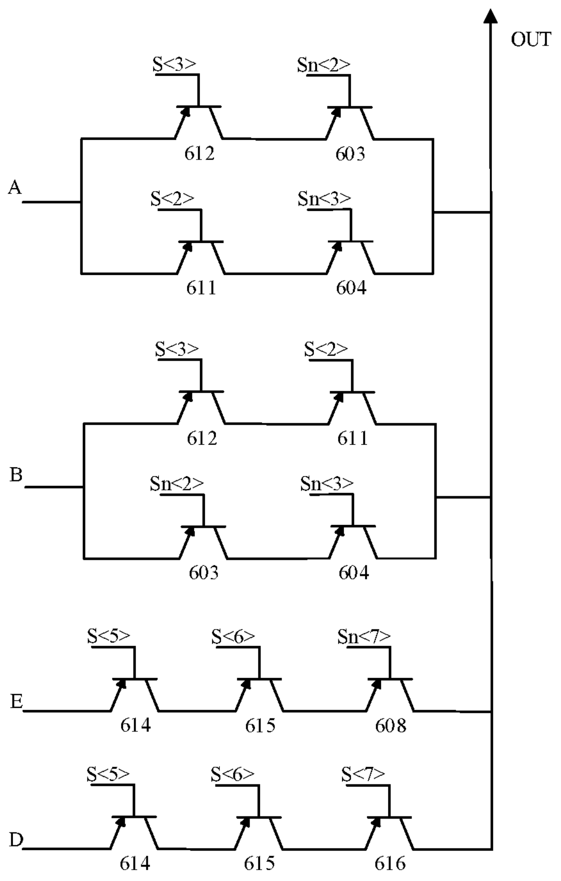
FIG. 4*a* is a schematic diagram showing a structure of a first output sub-circuit according to an embodiment of the present disclosure.

FIG. 4*a* is a schematic diagram showing a structure of a first output sub-circuit according to an embodiment of the present disclosure, and the first output sub-circuit is connected to the switch sub-circuits shown in FIGS. 3*a* to 3*c*. The first output sub-circuit 701 is configured to control itself to be connected to one of the first switch sub-circuits or one of the second switch sub-circuits according to bit 5, bit 6 and bit 7 of the Gray code control signal, or to be connected to the third switch sub-circuit or one of the fourth switch sub-circuits according to bit 2 and bit 3 of the Gray code control signal. That is, the first output sub-circuit 701 is configured to be connected to the output terminal D or E according to bit 5, bit 6 and bit 7 of the Gray code control signal, or to be connected to the output terminal A or B according to bit 2 and bit 3 of the Gray code control signal.

As shown in FIG. 4*a*, the first output sub-circuit 701 is connected to the output terminals of the plurality of fourth switch sub-circuits through a third transistor 603 and a twelfth transistor 612, and is connected to the output terminals of the plurality of fourth switch sub-circuits through a fourth transistor 604 and an eleventh transistor 611. The first output sub-circuit is connected to the third switch sub-circuit through an eleventh transistor 611 and a twelfth transistor 612, and is connected to the third switch sub-circuit through a fourth transistor 604 and a third transistor 603. The first output sub-circuit is connected to the output terminals of the plurality of first switch sub-circuits through a fourteenth transistor 614, a fifteenth transistor 615 and a sixteenth transistor 616, and is connected to the output terminals of the plurality of second switch sub-circuits through a fourteenth transistor 614, a fifteenth transistor 615 and an eighth transistor 608.

Figure 4B:
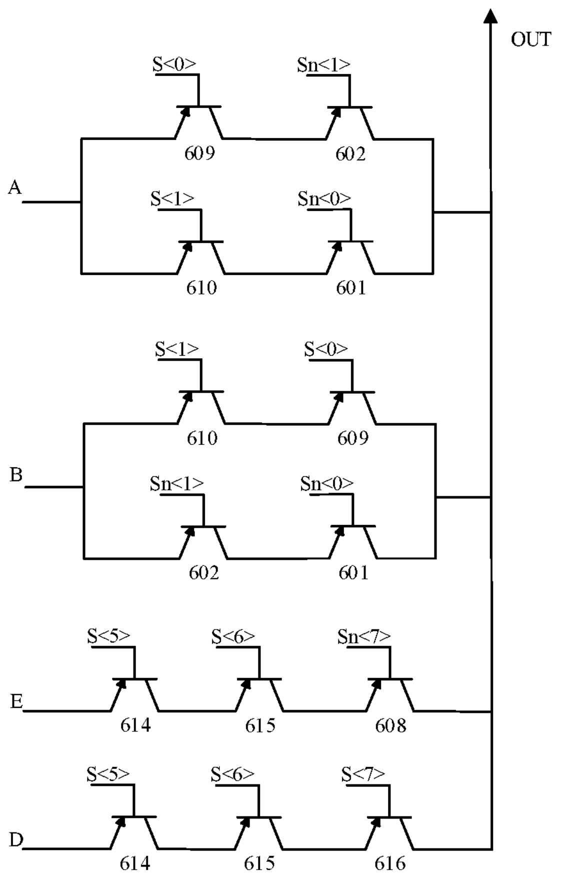
FIG. 4*b* is a schematic diagram showing a structure of a second output sub-circuit according to an embodiment of the present disclosure.

FIG. 4*b* is a schematic diagram showing a structure of a second output sub-circuit according to an embodiment of the present disclosure. The second output sub-circuit 702 is configured to control itself to be connected to one of the first switch sub-circuits or one of the second switch sub-circuits according to bit 5, bit 6 and bit 7 of the Gray code control signal, or to control itself to be connected to the third switch sub-circuit or one of the fourth switch sub-circuits according to bit 0 and bit 1 of the Gray code control signal.

As shown in FIG. 4*b*, the second output sub-circuit 702 is connected to the output terminals of the plurality of fourth switch sub-circuits through a second transistor 602 and a ninth transistor 609, and is connected to the output terminals of the plurality of fourth switch sub-circuits through a first transistor 601 and a tenth transistor 610. The second output sub-circuit is connected to the third switch sub-circuit through a ninth transistor 609 and a tenth transistor 610, and is connected to the third switch sub-circuit through a first transistor 601 and a second transistor 602. The second output sub-circuit 702 is connected to the output terminals of the plurality of first switch sub-circuits through a fourteenth transistor 614, a fifteenth transistor 615 and a sixteenth transistor 616, and is connected to the output terminals of the plurality of second switch sub-circuits through a fourteenth transistor 614, a fifteenth transistor 615 and an eighth transistor 608.

Figure 4C:
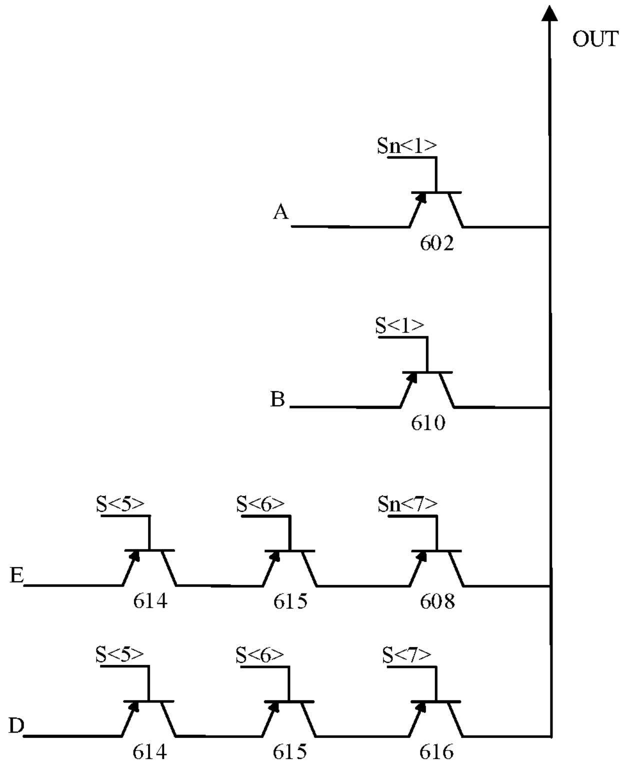
FIG. 4*c* is a schematic diagram showing a structure of a third output sub-circuit according to an embodiment of the present disclosure.

FIG. 4*c* is a schematic diagram showing a structure of a third output sub-circuit according to an embodiment of the present disclosure. The third output sub-circuit 703 is configured to control itself to be connected to one of the first switch sub-circuits or one of the second switch sub-circuits according to bit 5, bit 6, and bit 7 of the Gray code control signal, or control itself to be connected to the third switch sub-circuit or one of the fourth switch sub-circuits according to bit 1 of the Gray code control signal.

As shown in FIG. 4*c*, the third output sub-circuit 703 is connected to the output terminals of the plurality of fourth switch sub-circuits through a second transistor 602. The third output sub-circuit is connected to the third switch sub-circuit through a tenth transistor 610. The third output sub-circuit is connected to the output terminals of the plurality of first switch sub-circuits through a fourteenth transistor 614, a fifteenth transistor 615 and a sixteenth transistor 616. The third output sub-circuit is connected to the output terminals of the plurality of second switch sub-circuits through a fourteenth transistor 614, a fifteenth transistor 615 and an eighth transistor 608.

In some embodiments, the first output control circuit includes an operational amplifier, and an input terminal of the first output control circuit is configured to receive the four second analog voltage signals output by the plurality of output sub-circuits. The operational amplifier is configured to perform weighted summation according to the four second analog voltage signals to generate the analog grayscale voltage signal.

Specifically, the above-described gamma voltage conversion circuit is exemplarily described in detail below in connection with practical applications. Taking an example of enabling a group of first voltage divider output terminals, the grayscale values corresponding the group include a first grayscale value and three second grayscale values, the first grayscale value is the grayscale value of 48, and the three second grayscale values include the grayscale values of 49, 50 and 51. In a case where the analog grayscale voltage signal output by the gamma voltage conversion circuit corresponds to the grayscale value of 48, the corresponding Gray code is 00100000, the first output sub-circuit outputs an analog voltage corresponding to the grayscale value of 48, the second output sub-circuit outputs an analog voltage corresponding to the grayscale value of 48, the third output sub-circuit outputs two analog voltages corresponding to the grayscale value of 48, and the first output control circuit generates and outputs the analog grayscale voltage signal corresponding to the grayscale value of 48. In a case where the analog grayscale voltage output by the gamma voltage conversion circuit corresponds to the grayscale value of 49, the corresponding Gray code is 00100001, the first output sub-circuit outputs an analog voltage corresponding to the grayscale value of 48, the second output sub-circuit outputs an analog voltage corresponding to the grayscale value of 52, the third output sub-circuit outputs two analog voltages corresponding to the grayscale value of 48, and the first output control circuit generates and outputs the analog grayscale voltage signal corresponding to the grayscale value of 49 according to the four analog voltages. In a case where the analog grayscale voltage output by the gamma voltage conversion circuit corresponds to the grayscale value of 51, the corresponding Gray code is 00100010, the first output sub-circuit outputs an analog voltage corresponding to the grayscale value of 48, the second output sub-circuit outputs an analog voltage corresponding to the grayscale value of 52, the third output sub-circuit outputs two analog voltages corresponding to the grayscale value of 52, and the first output control circuit generates and outputs the analog grayscale voltage signal corresponding to the grayscale value of 51 according to the four analog voltages. In a case where the analog grayscale voltage output by the gamma voltage conversion circuit corresponds to the grayscale value of 50, the corresponding Gray code is 00100011, the first output sub-circuit outputs an analog voltage corresponding to the grayscale value of 48, the second output sub-circuit outputs an analog voltage corresponding to the grayscale value of 48, the third output sub-circuit outputs two analog voltages corresponding to the grayscale value of 52, and the first output control circuit generates and outputs the analog grayscale voltage signal corresponding to the grayscale value of 50 according to the four analog voltages.

The gamma voltage conversion circuit provided by the embodiments of the present disclosure can perform gamma voltage conversion by adopting a Gray code-based encoding circuit and the like, such that the response speed is improved, glitches and noise of the circuit are reduced, and grayscale display brightness change is smoother during grayscale-by-grayscale switching, thereby solving the problems of display jitter, power supply fluctuation, and the like caused by grayscale-by-grayscale switching. Further, since the output reaches a target potential more accurately, a voltage at a far end and a voltage at a near end of a panel are equal to each other, such that the brightness is uniform, and the brightness uniformity of the panel is better. On these bases, the embodiments of the present disclosure provides a sectional encoding type first encoding circuit, which adopts the first switch sub-circuits and the second switch sub-circuit to encode and output for a low grayscale (which is in the range of, for example, the above grayscales of 0 to 31) and a high grayscale (which is in the range of, for example, the above grayscales of 224 to 255), in a manner of encoding and outputting grayscale-by-grayscale, adopts the third switch sub-circuit and the fourth switch sub-circuits to encode and output for the grayscales in the middle portion (the analog voltages output therefrom correspond to the first grayscale values corresponding to the groups of the first voltage divider output terminals), and adopts the first output control circuit to generate an analog grayscale voltage based on multiple analog voltages, such that the precision of a grayscale output by the gamma voltage conversion circuit is ensured and the area occupied by the gamma voltage conversion circuit is reduced by half.

Specifically, in an example of 8-bit digital-to-analog conversion, 29 switching transistors, namely 512 switching transistors, are required in a conventional switch tree structure digital-to-analog conversion circuit to implement the 8-bit digital-to-analog conversion. In contrast, the 8-bit digital-to-analog conversion is realized based on a 6-bit digital-to-analog conversion and a 2-bit interpolation operational amplifier according to the embodiments of the present disclosure, and only 297 switching transistors are required based on the above-described multiplexing structure (i.e., sharing structure) of switching transistors, such that the occupied area can be reduced by half.

Figure 5:
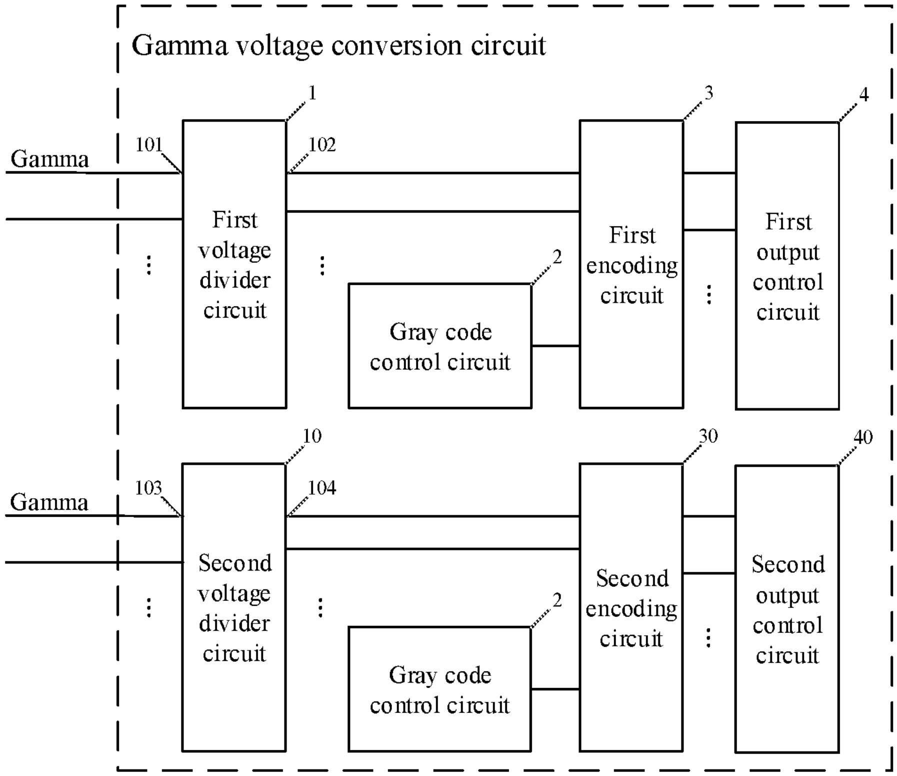
FIG. 5 is a schematic diagram showing a structure of another gamma voltage conversion circuit according to an embodiment of the present disclosure.

FIG. 5 is a schematic diagram showing a structure of another gamma voltage conversion circuit according to an embodiment of the present disclosure. Specifically, this structure is an alternative detailed embodiment based on the gamma voltage conversion circuit shown in FIG. 1. The circuit shown in FIG. 5 further includes a second voltage divider circuit 10, a second encoding circuit 30, and a second output control circuit 40.

The second voltage divider circuit 10 have a plurality of sixth input terminals 103 and a plurality of second voltage divider output terminals 104. Each sixth input terminal 103 is configured to receive a second gamma voltage signal input by a second gamma channel, and the second voltage divider circuit is configured to generate a plurality of third analog voltage signals according to the second gamma voltage signal. Each second voltage divider output terminal 104 is configured to output one of the plurality of third analog voltage signals.

The second encoding circuit 30 is configured to generate and output a plurality of fourth analog voltage signals according to the Gray code control signal and one of the plurality of third analog voltage signals.

The second output control circuit 40 is configured to generate and output an analog grayscale voltage signal according to the plurality of fourth analog voltage signals.

In some embodiments, in the circuit, each of the first encoding circuit 3 and the second encoding circuit 30 includes a plurality of switching transistors, each switching transistor of the first encoding circuit 3 is one of a P-type transistor and an N-type transistor, each switching transistor of the second encoding circuit 30 is the other of the P-type transistor and the N-type transistor, and signals at the control electrodes of the switching transistors of the first encoding circuit 3 are opposite to signals at the control electrode of the switching transistors of the second encoding circuit 30, respectively. In particular, since the signals are in form of a full-positive and half voltage, a high voltage and a low voltage are transmitted by the P-type transistor and the N-type transistor, respectively.

In some embodiments, the first encoding circuit 3 and the second encoding circuit 30 are connected to a same (i.e., one single) Gray code control circuit 2. Alternatively, Gray code control circuits 2 corresponding to the first encoding circuit 3 and the second encoding circuit 30 may be provided independently.

The embodiments of the present disclosure further provide a display device, which includes the gamma voltage conversion circuit according to any one of the foregoing embodiments.

Figure 6:
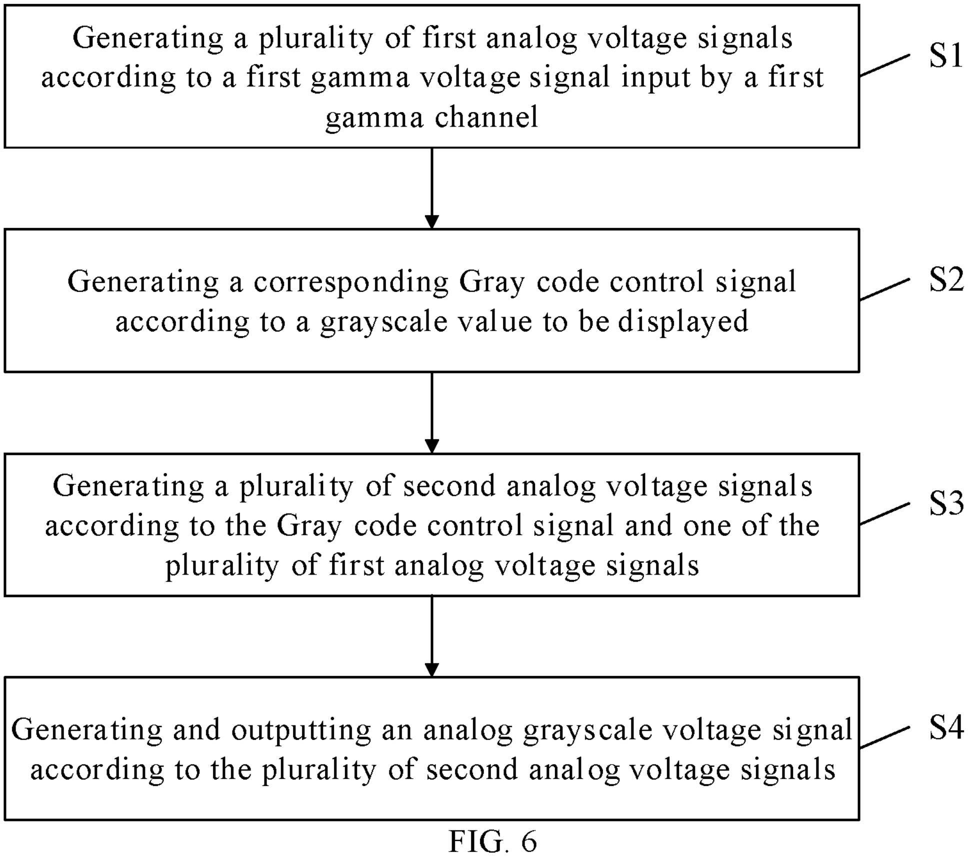
FIG. 6 is a flowchart of a gamma voltage conversion method according to an embodiment of the present disclosure.

FIG. 6 is a flowchart of a gamma voltage conversion method according to an embodiment of the present disclosure. For example, the method is applied to the gamma voltage conversion circuit according to any one of the foregoing embodiments. As shown in FIG. 6, the method includes the following steps S1 to S4.

Step S1 includes generating a plurality of first analog voltage signals according to a first gamma voltage signal input by a first gamma channel.

Step S2 includes generating a corresponding Gray code control signal according to a grayscale value to be displayed.

Step S3 includes generating a plurality of second analog voltage signals according to the Gray code control signal and one of the plurality of first analog voltage signals.

Step S4 includes generating and outputting an analog grayscale voltage signal according to the plurality of second analog voltage signals.

In some embodiments, the step S4 of generating and outputting an analog grayscale voltage signal according to the plurality of second analog voltage signals includes: performing weighted summation according to multiple analog voltages to generate the analog grayscale voltage signal.

In some embodiments, the method further includes: generating a plurality of third analog voltage signals according to a second gamma voltage signal input by a second gamma channel; generating a plurality of fourth analog voltage signals according to the Gray code control signal and one of the plurality of third analog voltage signals; and generating and outputting an analog grayscale voltage signal according to the plurality of fourth analog voltage signals.

Figure 7:
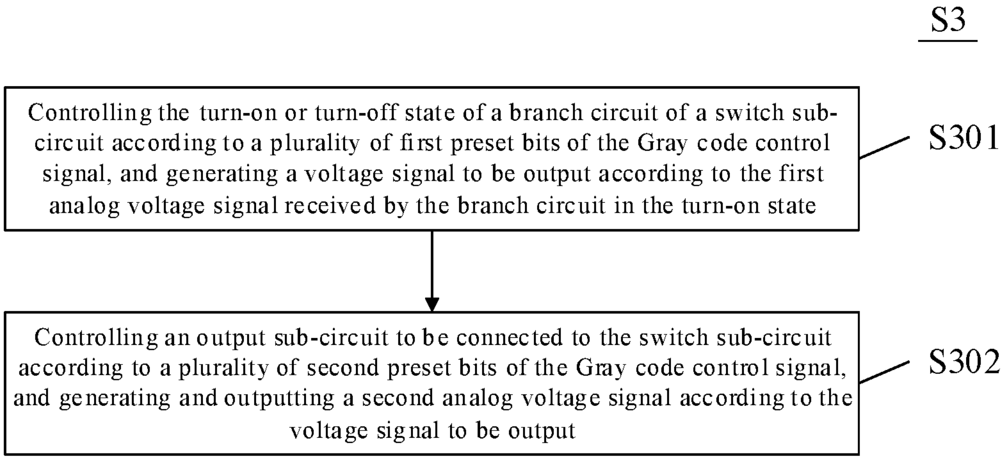
FIG. 7 is a flowchart of an exemplary implementation method of step S3 according to an embodiment of the present disclosure.

FIG. 7 is a flowchart of an exemplary implementation method of step S3 according to an embodiment of the present disclosure. Specifically, as shown in FIG. 7, the step S3 of generating the plurality of analog voltage signals according to the first analog voltage signals and the Gray code control signal corresponding to the first analog voltage signals includes the following steps S301 and S302.

Step S301 includes controlling the turn-on or turn-off state of a branch circuit of a switch sub-circuit according to a plurality of first preset bits of the Gray code control signal, and generating a voltage signal to be output according to the first analog voltage signal received by the branch circuit in the turn-on state.

Step S302 includes controlling an output sub-circuit to be connected to the switch sub-circuit according to a plurality of second preset bits of the Gray code control signal, and generating and outputting a second analog voltage signal according to the voltage signal to be output.

The gamma voltage conversion method provided by the embodiments of the present disclosure can be applied to a corresponding gamma voltage conversion circuit, can perform gamma voltage conversion based on a Gray code, and a switching process between any two adjacent grayscales corresponding to the Gray code causes at most two bits to be changed, such that the multi-bit switching as well as the unstable state and the intermediate state during the multi-bit switching are avoided, the response speed is improved, glitches and noise of the circuit are reduced, and the grayscale display brightness change is smoother during the grayscale-by-grayscale switching, thereby solving the problems of display jitter, power supply fluctuation, and the like caused by the grayscale-by-grayscale switching. Further, since the output reaches a target potential more accurately, a voltage at a far end and a voltage at a near end of a panel are equal to each other, such that the brightness is uniform, and the brightness uniformity of the panel is better.

It will be understood by one of ordinary skill in the art that all or some of the steps of the methods and functional modules/units in the device disclosed above may be implemented as software, firmware, hardware, and suitable combinations thereof. In a hardware implementation, the division between functional modules/units mentioned in the above description does not necessarily correspond to the division of physical components. For example, one physical component may have multiple functions, or one function or step may be performed by several physical components in cooperation. Some or all of the physical components may be implemented as software executed by a processor, such as a central processing unit, a digital signal processor, or a microprocessor, or implemented as hardware, or implemented as an integrated circuit, such as an application specific integrated circuit. Such software may be distributed on a computer readable medium, which may include a computer storage medium (or non-transitory medium) and communication medium (or transitory medium). The term of "computer storage medium" includes transitory and non-transitory, removable and non-removable media implemented in any method or technology for storage of information such as computer readable instructions, data structures, program modules or other data, as is well known to one of ordinary skill in the art. Computer storage media include, but are not limited to, RAM, ROM, EEPROM, flash memory or other memory technology, CD-ROM, Digital Versatile Disks (DVDs) or other optical disk storage, magnetic cassettes, magnetic tape, magnetic disk storage or other magnetic storage devices, or any other medium which can be used to store the desired information and which can accessed by a computer. In addition, communication media typically include computer readable instructions, data structures, program modules or other data in a modulated data signal such as a carrier wave or other transport mechanism, and include any information delivery media, as is well known to one of ordinary skill in the art.

Example embodiments have been disclosed herein, and although specific terms are employed, they are used and should be interpreted in a generic and descriptive sense only and not for purposes of limitation. In some instances, features, characteristics and/or elements described in connection with a particular embodiment may be used alone or in combination with features, characteristics and/or elements described in connection with other embodiments, unless expressly stated otherwise, as would be apparent to one of ordinary skill in the art. It will, therefore, be understood by one of ordinary skill in the art that various changes in form and details may be made therein without departing from the scope of the present disclosure as set forth in the appended claims.

What is claimed is:

1. A gamma voltage conversion circuit, comprising:

a first voltage divider circuit having a plurality of first input terminals and a plurality of first voltage divider output terminals, wherein each of the plurality of first input terminals is configured to receive a first gamma voltage signal input by a first gamma channel, the first voltage divider circuit is configured to generate a plurality of first analog voltage signals according to the first gamma voltage signal, and each of the plurality of first voltage divider output terminals is configured to output one of the plurality of first analog voltage signals;

a Gray code control circuit configured to generate and output a corresponding Gray code control signal according to a grayscale value to be displayed;

a first encoding circuit configured to generate and output a plurality of second analog voltage signals according to the Gray code control signal and one of the plurality of first analog voltage signals; and a first output control circuit configured to generate and output an analog grayscale voltage signal according to the plurality of second analog voltage signals;

wherein the first encoding circuit comprises a plurality of switch sub-circuits and a plurality of output sub-circuits; each of the plurality of switch sub-circuits comprises a plurality of branch circuits, each branch circuit has a second input terminal and a plurality of third input terminals, each second input terminal is configured to receive the first analog voltage signal output by one of the first voltage divider output terminals, each of the third input terminals is configured to receive a first preset bit of the Gray code control signal, each branch circuit is configured to control a turn-on or turn-off state of the branch circuit according to a plurality of first preset bits of the Gray code control signal, and generate a voltage signal to be output according to a received first analog voltage signal while the branch circuit is in the turn-on state; and each of the output sub-circuits has a plurality of fourth input terminals and a plurality of fifth input terminals, each of the fourth input terminals is configured to receive the voltage signal to be output from one of the switch sub-circuits, each of the fifth input terminals is configured to receive a second preset bit of the Gray code control signal, each output sub-circuit is configured to control itself to be connected to one of the switch sub-circuits according to a plurality of second preset bits of the Gray code control signal, and generate and output the second analog voltage signals according to the received voltage signal to be output;

wherein the plurality of first analog voltage signals are in one-to-one correspondence with grayscale values, the plurality of first voltage divider output terminals are in one-to-one correspondence with the grayscale values, the plurality of second analog voltage signals are in one-to-one correspondence with the grayscale values, and a total number of the grayscale values is $2^m$, where m is a positive integer; the plurality of switch sub-circuits comprise a plurality of first switch sub-circuits and a plurality of second switch sub-circuits, each first switch sub-circuit comprises 2n branch circuits, and each second switch sub-circuit comprises 2n branch circuits, where n is a positive integer; and the grayscale values are sorted in ascending order, each adjacent n ones of the first voltage divider output terminals form a group; for N groups of the first voltage divider output terminals of which corresponding grayscale values are smaller than or equal to a preset first threshold, each adjacent two groups of the first voltage divider output terminals are connected to the second input terminals of one of the first switch sub-circuits, where N is a positive integer; for M groups of the first voltage divider output terminals of which corresponding grayscale values are greater than or equal to a preset second threshold, each adjacent two groups of the first voltage divider output terminals are connected to the second input terminals of one of the second switch sub-circuits, and the second threshold is greater than the first threshold, where M is a positive integer; and wherein the plurality of switch sub-circuits further comprises a third switch sub-circuit and a plurality of fourth switch sub-circuits, the third switch sub-circuit comprises k branch circuits, and each of the plurality of fourth switch sub-circuits comprises n branch circuits, where $k=(2^m-N*n-M*n)/n$, and k is a positive integer; and for multiple groups of the first voltage divider output terminals of which corresponding grayscale values are greater than the first threshold and less than the second threshold, the grayscale values corresponding to each group of the first voltage divider output terminals comprise a first grayscale value that is the minimum and n−1 second grayscale values, and the first voltage divider output terminals corresponding to each adjacent n first grayscale values are sequentially and alternately connected to both n second input terminals of the third switch sub-circuit and second input terminals of one of the fourth switch sub-circuits.

2. The gamma voltage conversion circuit according to claim 1, wherein the first voltage divider circuit comprises a plurality of resistors connected in series, a connection node between any two of the plurality of resistors connected in series is a serially connected node, and each serially connected node corresponds to one of the plurality of first voltage divider output terminals.

3. The gamma voltage conversion circuit according to claim 1, wherein the Gray code control signal comprises a first Gray code signal and a second Gray code signal, and all bits of the first Gray code signal are opposite to respective bits of the second Gray code signal; and the first encoding circuit is further configured to generate and output the plurality of second analog voltage signals according to the first Gray code signal, the second Gray code signal, and one of the plurality of first analog voltage signals.

4. The gamma voltage conversion circuit according to claim 1, wherein m=8, n=4, the grayscale values are sorted in ascending order to comprise level 0 to level 255, the Gray code control signal comprises bit 0 to bit 7 in order from a low bit to a high bit, the first threshold is equal to the grayscale value of 31, and the second threshold is equal to the grayscale value of 224.

5. The gamma voltage conversion circuit according to claim 4, wherein the first preset bits corresponding to each of the first switch sub-circuits and the second switch sub-circuits comprise bit 0 to bit 4, the first preset bits corresponding to the third switch sub-circuit comprise bit 2 to bit 7, and the first preset bits corresponding to the fourth switch sub-circuits comprise bit 3 to bit 7.

6. The gamma voltage conversion circuit according to claim 5, wherein the first encoding circuit has a plurality of switching transistors, the plurality of switching transistors comprise: first to eighth transistors having control electrodes for receiving opposite bit 0 to opposite bit 7, respectively; and ninth to sixteenth transistors having control electrodes for receiving bit 0 to bit 7, respectively;

each of the first switch sub-circuits and the second switch sub-circuits comprises first to eighth branch circuits, the first branch circuit comprises a first transistor, a second transistor, a third transistor, a twelfth transistor, and a thirteenth transistor which are connected to each other in sequence, and is configured to receive the first analog voltage signal output by the first voltage divider output terminal corresponding to the grayscale value of 5+8i; the second branch circuit comprises a ninth transistor, the second transistor, the third transistor, the twelfth transistor, and the thirteenth transistor which are connected to each other in sequence, and is configured to receive the first analog voltage signal output by the first voltage divider output terminal corresponding to the grayscale value of 4+8i; the third branch circuit comprises a first transistor, a tenth transistor, the third transistor, the twelfth transistor, and the thirteenth transistor which are connected to each other in sequence, and is configured to receive the first analog voltage signal output by the first voltage divider output terminal corresponding to the grayscale value of 6+8i; the fourth branch circuit comprises a ninth transistor, the tenth transistor, the third transistor, the twelfth transistor, and the thirteenth transistor which are connected to each other in sequence, and is configured to receive the first analog voltage signal output by the first voltage divider output terminal corresponding to the grayscale value of 7+8i; the fifth branch circuit comprises a first transistor, a tenth transistor, an eleventh transistor, the twelfth transistor, and the thirteenth transistor which are connected to each other in sequence, and is configured to receive the first analog voltage signal output by the first voltage divider output terminal corresponding to the grayscale value of 1+8i; the sixth branch circuit comprises a ninth transistor, the tenth transistor, the eleventh transistor, the twelfth transistor, and the thirteenth transistor which are connected to each other in sequence, and is configured to receive the first analog voltage signal output by the first voltage divider output terminal corresponding to the grayscale value of 0+8i; the seventh branch circuit comprises a first transistor, a second transistor, the eleventh transistor, the twelfth transistor, and the thirteenth transistor which are connected to each other in sequence, and is configured to receive the first analog voltage signal output by the first voltage divider output terminal corresponding to the grayscale value of 2+8i; the eighth branch circuit comprises a ninth transistor, the second transistor, the eleventh transistor, the twelfth transistor, and the thirteenth transistor which are connected to each other in sequence, and is configured to receive the first analog voltage signal output by the first voltage divider output terminal corresponding to the grayscale value of 3+8i; and i is any one of 0, 1, 2, and 3 for the first switch sub-circuits, and i is any one of 28, 29, 30, and 31 for the second switch sub-circuits.

7. The gamma voltage conversion circuit according to claim 6, wherein the twelfth transistor and the thirteenth transistor are shared by the first to eighth branch circuits, the third transistor is shared by the first to fourth branch circuits, the eleventh transistor is shared by the fifth to eighth branch circuits, one second transistor is shared by the first and second branch circuits, one tenth transistor is shared by the third and fourth branch circuits, another tenth transistor is shared by the fifth and sixth branch circuits, and another second transistor is shared by the seventh and eighth branch circuits.

8. The gamma voltage conversion circuit according to claim 6, wherein each of the fourth switch sub-circuits comprises ninth to twelfth branch circuits, the ninth branch circuit comprises a fourth transistor, a thirteenth transistor, a sixth transistor, a fifteenth transistor, and a sixteenth transistor which are connected to each other in sequence, and is configured to receive the first analog voltage signal output by the first voltage divider output terminal corresponding to the first grayscale value of 60+32j; the tenth branch circuit comprises a twelfth transistor, the thirteenth transistor, the sixth transistor, the fifteenth transistor, and the sixteenth transistor which are connected to each other in sequence, and is configured to receive the first analog voltage signal output by the first voltage divider output terminal corresponding to the first grayscale value of 52+32j; the eleventh branch circuit comprises a fourth transistor, a fifth transistor, the sixth transistor, the fifteenth transistor, and the sixteenth transistor which are connected to each other in sequence, and is configured to receive the first analog voltage signal output by the first voltage divider output terminal corresponding to the first grayscale value of 44+32j; the twelfth branch circuit comprises a twelfth transistor, the fifth transistor, the sixth transistor, the fifteenth transistor, and the sixteenth transistor which are connected to each other in sequence, and is configured to receive the first analog voltage signal output by the first voltage divider output terminal corresponding to the first grayscale value of 36+32j; where j is any one of 0, 1, 2, 3, 4, and 5; and the third switch sub-circuit comprises a plurality of basic units, each of the plurality of basic units comprises thirteenth to sixteenth branch circuits, the thirteenth branch circuit comprises a third transistor, a thirteenth transistor, a sixth transistor, a fifteenth transistor, and a sixteenth transistor which are connected to each other in sequence, and is configured to receive the first analog voltage signal output by the first voltage divider output terminal corresponding to the first grayscale value of 56+32j; the fourteenth branch circuit comprises an eleventh transistor, a twelfth transistor, the thirteenth transistor, the sixth transistor, the fifteenth transistor, and the sixteenth transistor which are connected to each other in sequence, and is configured to receive the first analog voltage signal output by the first voltage divider output terminal corresponding to the first grayscale value of 48+32j; the fifteenth branch circuit comprises a third transistor, a fifth transistor, the sixth transistor, the fifteenth transistor, and the sixteenth transistor which are connected to each other in sequence, and is configured to receive the first analog voltage signal output by the first voltage divider output terminal corresponding to the first grayscale value of 40+32j; the sixteenth branch circuit comprises an eleventh transistor, a twelfth transistor, the fifth transistor, the sixth transistor, the fifteenth transistor, and the sixteenth transistor which are connected to each other in sequence, and is configured to receive the first analog voltage signal output by the first voltage divider output terminal corresponding to the first grayscale value of 32+32j; for each of the basic units, a fourth transistor is further connected between the eleventh transistor of the fourteenth branch circuit and the fifth transistor of the fifteenth branch circuit; for any adjacent two of the basic units, a fourth transistor is further connected between the eleventh transistor of the sixteenth branch circuit of one basic unit and the thirteenth transistor of the thirteenth branch circuit of the other basic unit.

9. The gamma voltage conversion circuit according to claim 8, wherein the sixth transistor, the fifteenth transistor and the sixteenth transistor are shared by the ninth to twelfth branch circuits, the thirteenth transistor is shared by the ninth and tenth branch circuits, and the fifth transistor is shared by the eleventh and twelfth branch circuits; and for each of the basic units, the sixth transistor, the fifteenth transistor and the sixteenth transistor are shared by the thirteenth to sixteenth branch circuits, the thirteenth transistor is shared by the thirteenth and fourteenth branch circuits, and the fifth transistor is shared by the fifteenth and sixteenth branch circuits.

10. The gamma voltage conversion circuit according to claim 4, wherein the plurality of output sub-circuits comprise a first output sub-circuit, a second output sub-circuit, and a third output sub-circuit, each of the output sub-circuits has four fourth input terminals, and the four fourth input terminals are configured to respectively receive the voltage signals to be output, which are output by corresponding first switch sub-circuits, corresponding second switch sub-circuits, corresponding third switch sub-circuit, and corresponding fourth switch sub-circuits; and each of the first output sub-circuit and the second output sub-circuit is configured to output one second analog voltage signal according to the voltage signal to be output, and the third output sub-circuit is configured to output two identical second analog voltage signals according to the voltage signal to be output.

11. The gamma voltage conversion circuit according to claim 10, wherein the first output sub-circuit is configured to control itself to be connected to one of the first switch sub-circuits or one of the second switch sub-circuits according to bit 5, bit 6 and bit 7 of the Gray code control signal, or to be connected to the third switch sub-circuit or one of the fourth switch sub-circuits according to bit 2 and bit 3 of the Gray code control signal;

the second output sub-circuit is configured to control itself to be connected to one of the first switch sub-circuits or one of the second switch sub-circuits according to bit 5, bit 6 and bit 7 of the Gray code control signal, or to be connected to the third switch sub-circuit or one of the fourth switch sub-circuits according to bit 0 and bit 1 of the Gray code control signal; and the third output sub-circuit is configured to control itself to be connected to one of the first switch sub-circuits or one of the second switch sub-circuits according to bit 5, bit 6 and bit 7 of the Gray code control signal, or to be connected to the third switch sub-circuit or one of the fourth switch sub-circuits according to bit 1 of the Gray code control signal.

12. The gamma voltage conversion circuit according to claim 11, wherein each of the output sub-circuits has a plurality of switching transistors comprising: first to eighth transistors having control electrodes for receiving opposite bit 0 to opposite bit 7, respectively; and ninth to sixteenth transistors having control electrodes for receiving bit 0 to bit 7, respectively;

the first output sub-circuit is connected to output terminals of the plurality of fourth switch sub-circuits through a third transistor and a twelfth transistor, and is connected to the output terminals of the plurality of fourth switch sub-circuits through a fourth transistor and an eleventh transistor; the first output sub-circuit is connected to the third switch sub-circuit through an eleventh transistor and a twelfth transistor, and is connected to the third switch sub-circuit through a fourth transistor and a third transistor; the first output sub-circuit is connected to output terminals of the plurality of first switch sub-circuits through a fourteenth transistor, a fifteenth transistor and a sixteenth transistor; and the first output sub-circuit is connected to output terminals of the plurality of second switch sub-circuits through a fourteenth transistor, a fifteenth transistor and an eighth transistor;

the second output sub-circuit is connected to the output terminals of the plurality of fourth switch sub-circuits through a second transistor and a ninth transistor, and is connected to the output terminals of the plurality of fourth switch sub-circuits through a first transistor and a tenth transistor; the second output sub-circuit is connected to the third switch sub-circuit through a ninth transistor and a tenth transistor, and is connected to the third switch sub-circuit through a first transistor and a second transistor; the second output sub-circuit is connected to the output terminals of the plurality of first switch sub-circuits through a fourteenth transistor, a fifteenth transistor and a sixteenth transistor; and the second output sub-circuit is connected to the output terminals of the plurality of second switch sub-circuits through a fourteenth transistor, a fifteenth transistor and an eighth transistor; and the third output sub-circuit is connected to the output terminals of the plurality of fourth switch sub-circuits through a second transistor; the third output sub-circuit is connected to the third switch sub-circuit through a tenth transistor; the third output sub-circuit is connected to the output terminals of the plurality of first switch sub-circuits through a fourteenth transistor, a fifteenth transistor and a sixteenth transistor; and the third output sub-circuit is connected to the output terminals of the plurality of second switch sub-circuits through a fourteenth transistor, a fifteenth transistor and an eighth transistor.

13. The gamma voltage conversion circuit according to claim 10, wherein the first output control circuit comprises an operational amplifier, an input terminal of the first output control circuit is configured to receive four second analog voltage signals output by the plurality of output sub-circuits, and the operational amplifier is configured to perform weighted summation according to the four second analog voltage signals to generate the analog grayscale voltage signal.

14. A display device, comprising the gamma voltage conversion circuit according to claim 1.

15. A gamma voltage conversion method for the gamma voltage conversion circuit according to claim 1, the gamma voltage conversion method comprising:

generating the plurality of first analog voltage signals according to the first gamma voltage signal input by the first gamma channel;

generating a corresponding Gray code control signal according to the grayscale value to be displayed;

generating the plurality of second analog voltage signals according to the Gray code control signal and one of the plurality of first analog voltage signals; and generating and outputting the analog grayscale voltage signal according to the plurality of second analog voltage signals;

wherein the generating the plurality of second analog voltage signals according to the Gray code control signal and one of the plurality of first analog voltage signals comprises: controlling a turn-on or turn-off state of a branch circuit of a switch sub-circuit according to a plurality of first preset bits of the Gray code control signal, and generating a voltage signal to be output according to the first analog voltage signal received by the branch circuit in the turn-on state; and controlling an output sub-circuit to be connected to the switch sub-circuit according to a plurality of second preset bits of the Gray code control signal, and generating and outputting the second analog voltage signals according to the voltage signal to be output;

or wherein the generating and outputting the analog grayscale voltage signal according to the plurality of second analog voltage signals comprises: performing weighted summation according to the plurality of second analog voltage signals to generate the analog grayscale voltage signal;

or the gamma voltage conversion method further comprises: generating a plurality of third analog voltage signals according to a second gamma voltage signal input by a second gamma channel; generating a plurality of fourth analog voltage signals according to the Gray code control signal and one of the plurality of third analog voltage signals; and generating and outputting the analog grayscale voltage signal according to the plurality of fourth analog voltage signals.

16. A gamma voltage conversion circuit, comprising:

a first voltage divider circuit having a plurality of first input terminals and a plurality of first voltage divider output terminals, wherein each of the plurality of first input terminals is configured to receive a first gamma voltage signal input by a first gamma channel, the first voltage divider circuit is configured to generate a plurality of first analog voltage signals according to the first gamma voltage signal, and each of the plurality of first voltage divider output terminals is configured to output one of the plurality of first analog voltage signals;

a Gray code control circuit configured to generate and output a corresponding Gray code control signal according to a grayscale value to be displayed;

a first encoding circuit configured to generate and output a plurality of second analog voltage signals according to the Gray code control signal and one of the plurality of first analog voltage signals;

a first output control circuit configured to generate and output an analog grayscale voltage signal according to the plurality of second analog voltage signals;

a second voltage divider circuit having a plurality of sixth input terminals and a plurality of second voltage divider output terminals, wherein each of the plurality of sixth input terminals is configured to receive a second gamma voltage signal input by a second gamma channel, the second voltage divider circuit is configured to generate a plurality of third analog voltage signals according to the second gamma voltage signal, and each of the plurality of second voltage divider output terminals is configured to output one of the plurality of third analog voltage signals;

a second encoding circuit configured to generate and output a plurality of fourth analog voltage signals according to the Gray code control signal and one of the plurality of third analog voltage signals; and a second output control circuit configured to generate and output an analog grayscale voltage signal according to the plurality of fourth analog voltage signals.

17. The gamma voltage conversion circuit according to claim 16, wherein each of the first encoding circuit and the second encoding circuit comprises a plurality of switching transistors, each switching transistor of the first encoding circuit is one of a P-type transistor and an N-type transistor, each switching transistor of the second encoding circuit is the other of the P-type transistor and the N-type transistor, and signals at control electrodes of the switching transistors of the first encoding circuit are opposite to signals at control electrodes of the switching transistors of the second encoding circuit, respectively.

18. The gamma voltage conversion circuit according to claim 16, wherein the first voltage divider circuit comprises a plurality of resistors connected in series, a connection node between any two of the plurality of resistors connected in series is a serially connected node, and each serially connected node corresponds to one of the plurality of first voltage divider output terminals.

19. The gamma voltage conversion circuit according to claim 16, wherein the Gray code control signal comprises a first Gray code signal and a second Gray code signal, and all bits of the first Gray code signal are opposite to respective bits of the second Gray code signal; and the first encoding circuit is further configured to generate and output the plurality of second analog voltage signals according to the first Gray code signal, the second Gray code signal, and one of the plurality of first analog voltage signals.

20. A display device, comprising the gamma voltage conversion circuit according to claim 16.

* * * * *